United States Patent [19]
Takamoto et al.

[11] Patent Number: 5,665,295
[45] Date of Patent: Sep. 9, 1997

[54] PROCESS FOR THE PRODUCTION OF COMPOSITE MOLDED ARTICLE

[75] Inventors: Hiromitsu Takamoto; Hidetoshi Okamura; Yuzo Aito, all of Iwakuni, Japan

[73] Assignee: Teijin Limited, Osaka, Japan

[21] Appl. No.: 510,882

[22] Filed: Aug. 3, 1995

[30] Foreign Application Priority Data

| Aug. 4, 1994 | [JP] | Japan | 6-183355 |
| Sep. 6, 1994 | [JP] | Japan | 6-212499 |
| Nov. 7, 1994 | [JP] | Japan | 6-272268 |
| Feb. 9, 1995 | [JP] | Japan | 7-021952 |
| May 8, 1995 | [JP] | Japan | 7-109504 |

[51] Int. Cl.⁶ ............................................. B29C 43/30
[52] U.S. Cl. .................... 264/172.19; 264/258; 264/273; 264/DIG. 6
[58] Field of Search .................. 264/344, DIG. 6, 264/273, 258, 172.19

[56] References Cited

U.S. PATENT DOCUMENTS

| 4,025,686 | 5/1977 | Zion . | |
| 4,250,136 | 2/1981 | Rex . | |
| 4,323,623 | 4/1982 | Ahrens et al. . | |
| 4,560,523 | 12/1985 | Plumley et al. | 264/DIG. 6 |
| 4,661,301 | 4/1987 | Okada et al. | 264/DIG. 6 |
| 5,236,646 | 8/1993 | Cochran et al. | 264/258 |
| 5,242,637 | 9/1993 | Inoue et al. . | |
| 5,258,089 | 11/1993 | Tanaka et al. | 264/DIG. 6 |
| 5,306,448 | 4/1994 | Kromrey | 264/258 |
| 5,529,731 | 6/1996 | Bendick et al. | 264/273 |

FOREIGN PATENT DOCUMENTS

| 0 370 147 | 5/1990 | European Pat. Off. . |
| 2 454 491 | 11/1980 | France . |
| 58-21579 | 5/1983 | Japan . |
| 58-21578 | 5/1983 | Japan . |
| 62-24521 | 6/1987 | Japan . |
| 92/22420 | 12/1992 | WIPO . |

OTHER PUBLICATIONS

Derwent Publications Ltd., London, GB; Class A94, AN 80-22631C & JP-A-55 021 204 (Sumitimo Bakelite KK) (Feb. 15, 1980) (abstract).

*Primary Examiner*—Allan R. Kuhns
*Attorney, Agent, or Firm*—Wenderoth, Lind & Ponack

[57] ABSTRACT

A process for the production of a composite molded article having two surface layer (skin) portions of a fiber-reinforced resin (FRP) and a core portion of a porous resin layer between the two surface layer portions, all of which portions are integrated. More specifically, the invention relates to a process for the production of a light-weight and tough composite article having a foamed core-sandwiched structure in which two dense surface layer (skin) portions of a fiber-reinforced resin and a core portion of a porous resin layer having numerous air foams are integrally molded such that the core portion is integrated between the above two dense surface layer portions. This process can be carried out at a low cost by a batch or continuous method.

66 Claims, 3 Drawing Sheets

PROCESS FOR THE PRODUCTION OF COMPOSITE MOLDED ARTICLE

The present invention relates to a process for the production of a composite molded article having two surface layer (skin) portions of a fiber-reinforced resin (FRP) and a core portion of a porous resin layer between the two surface layer portions, all of which portions are integrated. More specifically, it relates to a process for the production of a light-weight and tough composite article having a foamed core-sandwiched structure in which two dense surface layer (skin) portions of a fiber-reinforced resin and a core portion of a porous resin layer having numerous air foams are integrally molded such that the core portion is sandwiched between the above two dense surface layer portions, effectively at a low cost by a batch or continuous method.

PRIOR ART

Light-weight foamed core-sandwiched composite molded articles whose surface layer portions are of a fiber-reinforced resin (FRP) and whose core portion is porous are excellent in light-weight property and toughness, and they are therefore widely used in the fields of transporting vehicles and equipment such as aircraft, railroad cars, automobiles and vessels, various structural materials, interior and exterior decorative materials, medical equipment, electric communication equipment, sporting goods and panels for containers.

For producing the above composite molded articles, there is known (a) a method in which a pre-molded resin foam of polyurethane, polystyrene or polypropylene is used as a core material and a fiber-reinforced resin (FRP) plate is laminated on, and bonded to, each surface of the core, (b) a method in which a resin foam wrapped with a woven cloth as a reinforcement is placed in a mold and a curable liquid resin is injected into the mold and cured to form a shell, or (c) a method in which FRP is molded to prepare a shell in advance and a foaming polyurethane resin, or the like, is injected into the cavity (central space) of the shell and foamed in the cavity.

However, according to the above methods, the production efficiency is low and a large cost is required since the production of a composite molded article requires various steps and the operation procedures are complicated.

Further, for producing foamed core-sandwiched composite molded articles, the following methods are known.

JP-B-58-21579 discloses a process for producing a composite laminate having alternately laminated syntactic form layers and fiber-reinforced plastic layers containing no fine hollow spherical filler, which comprises applying a resin composition prepared by incorporating 10 to 60% by volume of a fine hollow spherical filler having an average particle diameter of 30 to 500 micrometers into an uncured liquid thermosetting resin to a fibrous reinforcement, and infiltrating the resin component of the composition into the fibrous reinforcement and curing the resin component under pressure in a state in which the resin composition remains on the fibrous reinforcement.

In the above process, it is required to properly select and combine the opening size of the fibrous reinforcement and the particle size of the fine hollow spherical filler for avoiding the leak of the fine hollow spherical filler into the fiber-reinforced plastic layer, and it is therefore difficult to select these two materials as required. In this process, further, it is difficult to effectively remove air contained in the resin or air bubbles produced by partial breakage of the fine hollow spherical filler, and the air and bubbles inevitably remain as pinholes or voids. Moreover, the fine hollow spherical filler is partially included in the fiber-reinforced plastic layer, and it is difficult to uniformly control the thickness of the formed fiber-reinforced plastic layer. It is therefore difficult to obtain products having uniform properties stably, and it is also difficult to obtain a composite molded article having a low specific gravity.

JUM-B-62-24521 discloses a fiber-reinforced unsaturated polyester resin light-weight molded article obtained by integrally molding two surface layers of a fiber-containing unsaturated polyester resin and a core layer of an unsaturated polyester resin containing 20 to 80% by volume of polyolefin-based foamed particles or crushed products thereof, the core layer being sandwiched between the two surface layers.

The above molded article contains foamed polyolefin-based particles are used, and the polyolefin-based particles have a relatively large size. In Example, it is disclosed that particles having a diameter of 6 mm are used, and the molded article obtained in Example has a total thickness of 5.8 mm. This molded article has no dense core layer since the particles have a large size. Further, the polyolefin-based resin particles are insufficient in adhesion to the unsaturated polyester resin, and no inorganic particles are used. As a result, the molded article obtained in the Example is insufficient in physical properties such as mechanical strength.

For overcoming the above defects, U.S. Pat. No. 5,242,637 discloses a process for the production of a composite molded article formed of a porous core portion and surface layer portions of a fiber-reinforced resin from expandable particles and a curable liquid molding resin. In the above process, a reinforcing fibrous sheet and a separation sheet are placed in a mold, a mixture of expandable particles and a curable liquid molding resin is fed thereon, further, the resultant laminate surface is covered with a separation sheet and a reinforcing fibrous sheet, the mold is closed and then heated to expand the expandable particles, the so-generated pressure is utilized to infiltrate the curable liquid molding resin into the upper and lower reinforcing fibrous sheets, and the curable liquid molding resin is cured to form the composite molded article having a foamed core-sandwiched structure. According to this process, a light-weight and tough composite molded article having a core portion of a porous resin layer containing expanded particles between the dense (non-porous) surface layers of a fiber-reinforced resin (FRP) and having its whole integrated is effectively produced.

The above molding method using expandable particles is advantageous in that a composite molded article having a foamed core-sandwiched structure can be formed in one step. However, when the expandable particles expand, gas leaks from some of the particles and causes voids on the molded article surface. Further, when some particles leak from the separation sheet, these expandable particles are liable to generate gas when reheated, and they may cause pinholes. Further, some of curable liquid molding resins may corrode the skin of the expandable particles so that gas leakage from the particles may easily occur. As a result, it is sometimes difficult to obtain a molded article having excellent surface properties.

In the above molding method, further, the control of timing in expanding the expandable particles and the timing in carrying out the curing reaction of the curable liquid molding resin are essential, and the temperature control therefor requires complicated steps. The above U.S. Patent also discloses an embodiment using compressed light-weight particles in place of the expandable particles, while this embodiment requires an additional step of compressing the particles.

It is therefore a first object of the present invention to provide a process for the production of a composite molded article having a foamed core-sandwiched structure, which process is free of any problem caused by the above prior art processes.

It is a second object of the present invention to provide a process for the production of the above composite molded article, by a simple method which can utilize a variety of liquid resins, and which permits a wide range of molding conditions such as molding temperature so that no complicated control is required.

It is a third object of the present invention to provide a process for the production of the above composite molded article free of voids and pinholes.

It is another object of the present invention to provide a process for the production of the above composite molded article excellent in physical properties such as mechanical strength.

It is further another object of the present invention to provide an industrially advantageous process for the production of a composite molded article.

According to the investigation of the present inventors, the above objects are achieved by a process for the production of a composite molded article in which a core portion of a porous resin layer is present between surface portions of a fiber-reinforced resin and the whole of the composite molded article is integrated, the process comprising the following steps, (a) the mixture preparation step of preparing a particles-containing resinous mixture of a curable liquid molding resin with light-weight filler particles having an average particle size of 0.01 to 2 mm, the light-weight filler particles being a mixture of rigid particles and compressible particles, (b) the laminate preparation step of preparing a laminate of a reinforcing fibrous sheet/separation sheet/layer of the resinous mixture in the above step (a)/separation sheet/reinforcing fibrous sheet, (c) the impregnation step of centripetally pressing and centrifugally relaxing the laminate at least once each, thereby removing gas bubbles other than gas bubbles contained in the particles with infiltrating the curable liquid molding resin contained in the layer of the resinous mixture into the reinforcing fibrous sheets through the separation sheets, and (d)
  (d-1) the step of heating the laminate under pressure or under no pressure to cure the resin to form the composite molded article, or
  (d-2) the step of heating the laminate under pressure or under no pressure to partially cure the resin to form a partially cured composite material having shape retainability, and then completing the curing of the partially cured composite material in a desired mold to form the composite molded article.

In the above process of the present invention, a mixture of rigid particles and compressible particles is used as light-weight filler particles, a mixture of the light-weight filler particles (mixture of particles) and a curable liquid molding resin is placed between two separation sheets, and the laminate is centripetally pressed and centrifugally relaxed at least once each before or while the curable liquid molding resin is impregnated into the reinforcing fibrous sheet, whereby gas bubbles other than gas bubbles contained in the particles can be smoothly removed so that a composite molded article free of voids and pinholes can be obtained. Moreover, the filler density of the light-weight filler particles in the core layer to be formed can be highly increased, so that the reinforcing fibrous sheet can be fully impregnated with the curable liquid molding resin. As a result, the formation of a dense and firm porous resin layer can be accomplished, and the formation of fiber-reinforced resin layers (surface portions) excellent in surface properties and appearance can be accomplished. Further, there can be obtained a composite molded article in which the porous resin portion (core layer) are firmly bonded to the surface portions and these portions are integrated.

In other words, a mixture of rigid particles and compressible particles is used as light-weight filler particles, the properties of these two kinds of particles are advantageously utilized, the separation sheets are allowed to function the most favorably, and the laminate is pressed and relaxed at least once each, preferably several times, whereby the above advantages can be achieved.

The process for the production of a composite molded article, provided by the present invention will be explained in detail hereinafter.

First, the main molding materials used in the process of the present invention, i.e., reinforcing fibrous sheet, separation sheet, light-weight filler particles and curable liquid molding resin, and optionally used materials will be explained below.

The reinforcing fibrous sheet used as one of the main molding materials is selected from sheet-shaped fibrous structures of reinforcing fibers. Examples of the reinforcing fibers include a glass fiber, a carbon fiber, a silicon carbide fiber, a metal fiber, an aramid fiber, a polyarylate fiber and a high-strength polyolefin fiber. These reinforcing fibers may be used alone or in combination. Further, the reinforcing fiber may be selected from a polyester fiber, a polyamide fiber, a polyvinyl alcohol (Vinylon) fiber, a rayon fiber, an acetate fiber and a natural fiber. Of the above fibers, preferred are high-strength high-modulus fibers such as a glass fiber, a carbon fiber and a para-aramid fiber.

The form of the reinforcing fibrous sheet includes sheet-shaped structures of woven fabrics (plain woven fabric, cord fabric, twill fabric, etc.), braid, knitted fabric, non-woven fabric, mat, paper and one-directionally aligned laminar roving. These fibrous sheets may be used alone or in combination. The fibrous sheet may be used as a prepreg impregnated with a curable liquid molding resin to be explained later. The reinforcing fibrous sheet is properly selected depending upon the form and use of a composite molded article, the physical properties and performance required of the molded article, and the appearance of the molded article.

In the process of the present invention, when the laminated is pressed at a molding step, the curable liquid molding resin is squeezed out of the above mixture comprising the curable liquid molding resin and the light-weight filler particles present in a porous core-forming portion, and the curable liquid molding resin infiltrates the upper and lower fibrous sheets. Part of the curable liquid molding resin also filtrates close to surface portions. In this case, for forming dense surface portions (i.e., top and bottom fiber-reinforced resin layers), it is required to prevent the penetration of the light-weight filler particles into the reinforcing fibrous sheets.

In the process of the present invention, therefore, a separating-functional sheet (separation sheet) which substantially does not pass the light-weight filler particles but passes the curable liquid molding resin is placed on each surface (core side) where the mixture of the light-weight filler particles and the curable liquid molding resin contacts the top and bottom reinforcing fibrous sheets. That is, in the process of the present invention, it is important to place the above separation sheet between the above mixture layer and the top reinforcing fibrous sheet and to place the above separation sheet between the above mixture layer and the bottom reinforcing fibrous sheet.

The separation sheet which can perform the above separating (partitioning) function is selected from fiber and porous sheets having a small opening size. Examples of the fiber sheets for use as the separation sheet include woven fabric, knitted fabric, braided fabric, non-woven fabric and paper of a natural fiber, a synthetic fiber or an inorganic fiber. The porous sheets are sheets or films having through pores, and examples thereof include foamed sheets of polyurethane, polystyrene and polypropylene, and porous films of polyethylene, polypropylene and polysulfone, produced by a stretching, extraction or coagulation method. The opening of the separation sheet is properly selected depending upon the size of the light-weight filler particles. Further, as a raw material for the separation sheet, an expandable and shrinkable material may be used so that it can easily meet with the form of the molded article.

The separation sheet may be partly constituted of a material which does not pass the curable liquid molding resin. For example, the separation sheet may be a sheet formed by combining a portion formed of a material having a separating function and a material other than the material having a separating function, a separating-functional sheet whose opening is partly sealed with a resin, a fiber sheet of heat-fusible material such as a polypropylene sheet, whose opening is partly destroyed, or a sheet of a material having a separating function to which a non-porous film is partly attached.

The separation sheet may be selected from fiber sheets having a function as a reinforcing material, such as sheets of a glass fiber, a carbon fiber and an aramid fiber having a small opening size. In this case, the above fiber sheet can be used both as a reinforcing fibrous sheet and as a separation sheet.

However, it is preferred to provide the reinforcing fibrous sheet and the separation sheet separately in kind, since the opening size of the reinforcing fibrous sheet can be selected as required. For example, a one-directionally aligned prepreg and a preform of a three-dimensionally woven fabric can be used. Further, in this case, the material can be selected depending upon the required appearance and required properties of the molded article.

According to the studies of the present inventors, it has been found that non-woven fabrics of continuous filament having a small opening size, commercially available in the trade name of "Unisel", etc., are suitable as a separation sheet, since they are excellent in separating function and handling properties.

In the process of the present invention, a mixture of rigid particles and compressible particles as the light-weight filler particles is used advantageously. These light-weight filler particles are substantially not expanded under curing and molding conditions, and these light-weight filler particles are hollow or contain gas bubbles.

The light-weight filler particles are selected from those having an average particle size (diameter) of 0.01 to 2 mm, preferably 0.08 to 1 mm. When the average particle size of the light-weight filler particles is smaller than 0.01 mm, fine particles are liable to pass through the separation sheet to penetrate the surface portions, so that the denseness of the surface portions decreases, which results in a decrease in the strength of the molded article. When the above average particle size exceeds 2 mm, it is difficult to prepare a uniform mixture of the light-weight filler particles with the curable liquid molding resin, and handling properties become poor. Further, the molded article is liable to have an uneven pattern on its surface and is poor in surface properties.

The light-weight filler particles preferably have a specific gravity (in average) of 0.02 to 0.8. The small specific gravity is advantageous in view of light-weightness, while the light-weight filler particles are liable to undergo breaking when they have too small a specific gravity. Filler particles having a specific gravity greater than the above upper limit have no sufficient effect on decreasing the weight of the molded article, which results in a decrease in the commercial product quality of the molded article. The specific gravity (in average) of the light-weight filler particles is particularly preferably 0.05 to 0.7. The term "specific gravity" refers to a weight (g) based on the substantial volume ($cm^3$) of the particles, and is expressed in the unit of $g/cm^3$.

As explained above, the process of the present invention uses a mixture of particles of two types as the light-weight filler particles. One type of the light-weight filler particles is rigid particles, and the other type is compressible particles. The "rigid particles" refers to particles whose form substantially does not alter in series of steps of producing the composite molded article of the present invention. Generally, inorganic particles are suitable as the rigid light-weight particles. Specific examples of the rigid particles include inorganic hollow particles called glass balloon, silica balloon and Shirasu balloon (hollow particles of silicic acid derivatives).

The compressible particles used in the mixture with the above rigid particles are low-specific gravity fine particles which are monocell- and/or multicell-like resin particles containing gas in their interiors and which undergo compression-deformation (elastic deformation or plastic deformation) under pressure so that their own volume is decreased by approximately 1 to 70% (preferably approximately 5 to 50%). Typical examples of the compressible particles include hollow resin particles prepared by expanding foamable resin particles under heat in advance and porous polypropylene particles. Therefore, the compressible particles are non-expandable particles of one type which are substantially not volume-expanded when reheated, while the compressible particles differ from inorganic hollow particles such as glass beads used in conventional syntactic form molding in that the compressible particles can be compression-deformed under pressure at a molding time.

Specific examples of the above compressible light-weight particles include those prepared by expanding foamable resin particles under heat in air or inert gas, such as "Matsumoto Microsphere" supplied by Matsumoto Yushi Seiyaku K.K., "Expancel" supplied by Novel Industries and polypropylene beads "15 P" supplied by JSP.

The specific gravity of the above compressible light-weight particles is relatively smaller than the specific gravity of the rigid particles, and generally, the specific gravity of the compressible light-weight particles to be used is generally 0.3 or less, preferably 0.02 to 0.2, more preferably 0.03 to 0.15.

The mixing ratio of the above rigid particles: the above compressible particles by volume is 95:5 to 5:95, preferably 90:10 to 10:90.

The curable liquid molding resin which is mixed with the above mixture is used as a thermosetting resin composition, and it is selected from an epoxy resin, a polyurethane resin, an unsaturated polyester resin, a polyvinyl ester resin, a polyimide resin, a phenolic resin, and a polydicyclopentadiene resin. Of these resins, preferred are an epoxy resin, an unsaturated polyester resin and a phenolic resin. Generally, the curable liquid molding resin is used as a composition containing the liquid molding resin, a curing agent, a curing promoter and a diluent as required.

In the process of the present invention, the curable liquid molding resin can be selected from a wide range of kinds of liquid molding resins regardless of the kind of the light-weight filler particles, since the resin particles are not foamed during the molding step. The curable liquid molding resin is preferably a resin which is in a liquid state at room temperature, while the curable liquid molding resin may be a resin which is in the form of a solid (powder) or a semi-solid (paste) at room temperature if it can be in a liquid state at a molding temperature.

The mixing ratio of the light-weight filler particles and the curable liquid molding resin is preferably set such that the volume of the particles in the entire core portion of the molded article is in the range of 50 to 80% by volume.

In the process of the present invention, in addition to the above light-weight filler particles and the above curable liquid molding resin, an auxiliary material may be used for improving the molded article in mechanical properties. The auxiliary material includes fibers whose length is smaller than 6 mm, such as short fibers or whiskers of carbon, aramid, silicon carbide, potassium titanate and boron. Further, for imparting the molded article with functions of electromagnetic wave shielding effect, etc., or for preventing the occurrence of a local high-temperature site by absorbing exotherm and controlling a sharp temperature elevation when the liquid molding resin system is cured, carbon, graphite, silicon carbide whisker, milled glass fiber, mica, iron powder, calcium carbonate, silica sand, a pigment, and the like may be incorporated. Further, a milled product of recycled materials may be incorporated. In any case, preferably, the amount of these materials is set such that the core portion of the molded article has a specific gravity of 0.8 or less.

The impregnated laminate is pressed, relaxed and molded with a flexible film placed on that surface of one or each of the top and bottom reinforcing fibrous sheets which is not in contact with the separation sheet, whereby the steps of impregnation and defoaming can be more stably carried out, the processability of the laminate improves and the molded article can be improved in surface properties.

When the above flexible film is selected from those which firmly bond to the top and bottom reinforcing fibrous sheets, the light-weight foamed core-sandwiched composite molded article having an excellent film surface can be formed as a product. When the above flexible film is selected from those which can be easily peeled off from the reinforcing fibrous sheets of the molded article, and removed after the molding, the moldability and the surface properties are improved.

The above flexible film is selected from various flexible films or sheets. Specific examples of the flexible film include a polyester film, a polycarbonate film, a nylon film, a polypropylene film, a polyethylene film, a polyvinyl chloride film, a polyvinylidene chloride film, a fluorine-containing film, a polyimide film, a polyarylate film, cellophane and a triacetate film, a film of a copolymer of the above polymers, a co-extrusion film of the above polymers, metal foils of aluminum, copper or iron, and a paper or non-woven fabric processed with a resin to inhibit liquid transmission.

For improving the composite molded article in appearance or surface functions, for example, a woven fabric, a non-woven fabric, a film or an artificial leather for surface decoration may be used as an outermost material.

In the process of the present invention, further, for improving the composite molded article in physical properties, particularly for overcoming the deflection under a bending load, an inner reinforcement material may be locally provided in the core portion such that the reinforcement material is in contact with the top and bottom surface layer (skin) portions containing the reinforcing fibrous sheet, and the so-formed core-reinforced composite molded article is preferred in some cases depending upon the form and use of the composite molded article. Examples of the reinforcement material which are locally provided include a braided strand, a rope, a braided fabric, a rod, a corrugate-shaped article, and a honeycomb. The raw material therefor is preferably selected from glass, aramid, polyester, polyamid and cellulose. In particular, a braided strand of glass fiber is preferred, while the reinforcement material shall not be limited to the above materials.

The above inner reinforcement material is required to have a size (thickness) sufficient for coming in contact with, and combine, the top and bottom surface layer portions, when it is provided in the core portion. The upper limit of the size is not much limited, while it adds an additional weight so that it is economical to use a reinforcement material having a size or a thickness which is 1.2 to 50 times as large as the thickness of the surface layer (skin) portion.

According to the process of the present invention, the intended composite molded article can be obtained by providing the above materials, and carrying out the following steps (a) to (d), as described above, (a) the mixture preparation step of preparing the particles-containing resinous mixture, (b) the laminate preparation step, (c) the impregnation step, and (d) the curing step.

The important point in the above steps to use two types of particles, i.e., the rigid particles and the compressible particles as the light-weight filler particles, to form the laminate including two thin separation sheets, one placed on one surface of the core layer and the other placed on the other surface of the core layer, and to press and relax the laminate at least once each. By the above pressing and the above relaxation, the layer of the resinous mixture comprising the light-weight filler particles and the curable liquid molding resin is effectively and uniformly formed, and the laminate is brought into a state in which gas bubbles (e.g., air and gas formed by the destruction of part of the particles) other than those of the particles are released or easily releasable.

That is, by the pressing and the relaxation, not only a uniform and dense porous layer (core layer) is formed, but also the curable liquid molding resin infiltrates the reinforcing fibrous sheets through the separation sheets to form surface layer portions having toughness and excellent surface properties.

In the process of the present invention, the intended composite molded article can be obtained by carrying out the above steps (a) to (d) generally in this order. This molding method of the present invention can be carried out by any one of a batch method in which the laminate is molded in a mold and a continuous method in which an endless molded article is obtained by continuously carrying out the above steps.

According to the investigation of the present inventors, it has been found that the batch method [I] and the continuous method [II] to be explained below are excellent for carrying out the steps (a) to (d). These methods will be explained hereinafter, while the raw materials are selected from those explained above unless otherwise specified. The features of the methods and the conditions for the methods will be mainly explained.

[I] Batch method

In the production of a composite molded article in which a core portion of a porous resin layer is present between two surface portions of a fiber-reinforced resin and the whole of the composite molded article is integrated, the method for the production of the composite molded article including the following steps, (a) the resinous mixture preparation step of preparing a particles-containing mixture of a curable liquid molding resin with light-weight filler particles having an average particle size of 0.01 to 2 mm, the light-weight filler particles being a mixture of rigid particles and compressible particles, (b) the laminate preparation step of preparing a laminate of a reinforcing fibrous sheet/separation sheet/layer of the resinous mixture in the above step (a)/separation sheet/reinforcing fibrous sheet, (c) the impregnation step of centripetally pressing and centrifugally relaxing the laminate at least once each, thereby removing gas bubbles other than gas bubbles contained in the particles with infiltrating the curable liquid molding resin contained in the layer of the resinous mixture into the reinforcing fibrous sheets through the separation sheets, (d) the curing step of curing the curable liquid molding resin and molding the laminate by heating the laminate in a mold heated at a predetermined temperature to form the cured composite molded article, and (e) the step of opening the mold and taking out the obtained composite molded article.

In the above batch method, at least the curing step (d) is carried out in a mold, while the impregnation step (c) may be also carried out in a mold. The batch method is therefore classified into the following methods [I]-(1) and [I]-(2) depending upon the use or non-use of a mold in the impregnation step (c).

[I]-(1)

A method in which the mixture preparation step (a) and the laminate preparation step (b) are carried out outside a mold, and the impregnation step (c) and the curing step (d) are carried out in a mold.

[1]-(2)

A method in which the mixture preparation step (a), the laminate preparation step (b) and the impregnation step (c) are carried out outside a mold, and then the curing step (d) is carried out in a mold.

In the batch method [I], a mold is used, and the mold is selected from a metal mold, a wood mold and a resin mold depending upon the molding temperature and pressure.

A laminate shaped by stacking at least two reinforcing fibrous sheets, at least two separation sheets and a layer of the resinous mixture of the curable liquid molding resin and the light-weight filler particles in the order of reinforcing fibrous sheet/separation sheet/layer of the above resinous mixture/separation sheet/reinforcing fibrous sheet is set in the cavity of a mold, and molded.

The above laminate may be shaped in a mold, or the laminate which is partially or wholly shaped outside a mold may be set in a mold, while it is preferred to shape the laminate outside a mold and then set it in a mold in view of production efficiency.

When a core portion reinforcement material is placed in a mold for molding, the reinforcement material is arranged in an amount sufficient for obtaining necessary flexural rigidity and in a necessary reinforcement direction in view of the bending direction and bending of the molded article product.

When the above laminate is shaped, the marginal portions (peripheral portions) of the two separation sheets may be preliminarily bonded to each other in the form of a bag or an envelope by fusing, adhesion or stitching and then cut open in part of its upper surface so that the mixture of the light-weight filler particles and the curable liquid molding resin is injected therethrough.

In the above case, the opening portion is closed or covered with other separation sheet, and then the reinforcing fibrous sheet to be placed on the upper side is placed thereon to form the laminate (in this case, therefore, the laminate has a structure of reinforcing fibrous sheet/envelope-like separation sheet containing a layer of the above resinous mixtures/reinforcing fibrous sheet).

When the mixture of the liquid molding resin and the light-weight filler particles contains gas (gas bubbles), the molded article surface and the fiber-reinforced resin layer are liable to have voids and pinholes. When the mixture is prepared, it is therefore possible to take care not to include non-coagulatable gas such as air and nitrogen in the mixture, or the mixture may be defoamed by treating it under reduced pressure in advance.

In the process of the present invention, before or after the above laminate is placed in a mold, the laminate is centripetally pressed to squeeze the liquid molding resin through the separation sheets to infiltrate it into the top and bottom reinforcing fibrous sheets, and a uniform porous layer substantially having no void is formed between the separation sheets. In this case, it is important to press and relax the laminate. In the batch method, the pressing and the relaxation can be performed discontinuing the pressing in a mold while the mold is closed, and again pressing the laminate before the viscosity of the curable resin increases to form a gel. The above pressing and the above relaxation may be carried out once each, or may be repeated twice or three times each.

Before the laminate is placed in a mold, the laminate may be pressed with a roller or a flat plate for carrying out the above pressing and relaxation. Each of the pressing and the relaxation can be carried out at least once, preferably twice or more, by the use of a combination of roller or by pressing and discontinuing the pressing. By the above pressing and relaxation, the liquid molding resin infiltrates the reinforcing fibrous sheets to get the sheet wet fully, and gas (gas bubbles) in the laminate is released out of the laminate, so that a uniform porous core layer substantially having no void is formed.

The liquid molding resin can be also infiltrated into the reinforcing fibrous sheets by placing the laminate formed of reinforcing fibrous sheet/separation sheet/the above resinous mixture/separation sheet/reinforcing fibrous sheet under reduced pressure. In this case, the defoaming of the mixture is also effectively carried out concurrently with the infiltration. In the process of the present invention, preferably, this treatment under reduced pressure is followed by pressing treatment with a roller, etc.

A film may be provided on one or each of the reinforcing fibrous sheet surfaces of the laminate. Further, a molded article having excellent surface properties may be obtained when the laminate is molded with a film placed between at least one reinforcing fibrous sheet surface of the laminate and the mold cavity wall. The film(s) may be peeled off after the molding, or the film(s) may be retained on the molded article surface(s) to improve the surface appearance and properties of the molded article.

For the molding of the laminate, it is preferred to preheat the mold for improving the productivity. The preliminary temperature of the mold is preferably a temperature equal to, or higher than, the temperature at which the curing of the curable liquid molding resin starts.

After the mold is closed, the mold is heated to cure the liquid molding resin for molding the laminate. Generally, the mold is heated with a heating jacket having an electric heater or a heating medium, while induction heating or dielectric heating may be used. Further, heat generated by the curing of the resin may be used. In this case, it is preferred to heat the mold and cure the resin, after the mold is sealed and the pressure in the mold is reduced.

When the molding is finished by completion of curing of the resin, the mold is opened and the molded article is taken out, whereby the intended composite molded article having a foamed core-sandwiched structure is obtained.

In the above batch method, the curing step is carried out in a mold, and it is suitable for producing not only a molded article having a flat plate structure but also a molded article having a special form or a complicated form, e.g., having a protuberance or a dent.

[II] Continuous method

In the production of a composite molded article in which a core portion of a porous resin layer is present between two surface portions of a fiber-reinforced resin and the whole of the composite molded article is integrated, the method for the production of the composite molded article including the following steps, (a) the mixture preparation step of preparing a particles-containing resinous mixture of a curable liquid molding resin with light-weight filler particles having an average particle size of 0.01 to 2 mm, the light-weight filler particles being a mixture of rigid particles and compressible particles, (b) the laminate preparation step of continuously feeding two separation sheets and two reinforcing fibrous sheets such that the two separation sheet are positioned between the two reinforcing fibrous sheets and continuously feeding the mixture prepared in the above step (a) into a space between the two separation sheets, to continuously prepare a laminate of a reinforcing fibrous sheet/separation sheet/layer of the resinous mixture prepared in the above step (a)/separation sheet/ reinforcing fibrous sheet, (c) the impregnation step of centripetally pressing and centrifugally relaxing the laminate at least once each, thereby removing gas bubbles other than gas bubbles contained in the particles with infiltrating the liquid molding resin contained in the layer of the resinous mixture into the reinforcing fibrous sheets through the separation sheets, and (d) the curing step of heating the laminate under pressure or under no pressure to cure the resin to form the composite molded article.

In the above continuous method, the curing step (d) may be a preliminary curing step of partially curing the impregnated laminate by heating it under pressure or under no pressure, to obtain a partially cured composite material having shape retainability. The present invention includes the embodiment of the above preliminary curing step. This embodiment gives a preliminarily cured intermediate composite molded article, which corresponds to a B-state molded article amount epoxy resin molded articles. The intermediate composite molded article can be converted to an end-product composite molded article by further heating and shaping it as required. The intermediate composite molded article has shape retainability at room temperature, and can be altered in form at room temperature or elevated temperature. The intermediate composite molded article can be converted to an end-product molded article by shaping it under heat.

The continuous method of the present invention is preferably carried out by conveying a three layered sheet of separation sheet/reinforcing fibrous sheet/flexible film, continuously forming a layer of the resinous mixture on the separation sheet surface, laminating a separation sheet, a reinforcing fibrous sheet and an optional flexible film on the surface of the mixture layer in the order of the separation sheet, the reinforcing fibrous sheet and the optional flexible sheet, to form a laminate of flexible film/reinforcing fibrous sheet/separation sheet/layer of the resinous mixture/ separation sheet/reinforcing fibrous sheet/optional flexible film, carrying out the impregnation step of passing the laminate through the nip of at least one pair of rollers to centripetally press and centrifugally relax the laminate, maintaining flat surfaces of the laminate, and then carrying out the curing step.

In the above continuous method, the (preliminary) composite molded article or partially cured composite material is produced by continuously carrying out the laminate preparation step (b), the impregnation step (c) and the curing step (or partially curing step). In the continuous method, therefore, the composite molded article is obtained through a laminate formation zone, an impregnation zone and a curing zone which are located consecutively.

In the above continuous method, one layer of the reinforcing fibrous sheet and the other layer of the reinforcing fibrous sheet are fed to the laminate formation zone with continuously allowing it to run one above the or her in parallel. In this case, two separation sheets are also fed into a space between the two reinforcing fibrous sheets (a space formed by those surfaces of the reinforcing fibrous sheets which face each other), the mixture of the light-weight filler particles and the liquid molding resin is further fed into a space between the two separation sheets (portion to form a core) in a layer-forming manner to sandwich the layer of the mixture between two laminates each of which is formed of the reinforcing fibrous sheet and the separation sheet, whereby the laminate of reinforcing fibrous sheet/separation sheet/layer of the resinous mixture/separation sheet/ reinforcing fibrous sheet is formed.

In industrial practice, the above continuous method may be carried out as follows. First, in the laminate preparation zone, the separation sheet for a bottom layer is laminated on the continuously fed bottom-layer reinforcing fibrous sheet, and then, a nearly uniform layer of the above mixture having a predetermined thickness is formed on the separation sheet. Then, the continuously fed separation sheet for a top layer and the continuously fed top-layer reinforcing fibrous sheet are consecutively stacked thereon such that the top layer and the bottom layer sandwich the layer of the mixture. In this case, the side portions (edge portions) of the separation sheet on the layer of the mixture and the separation sheet below the layer of the mixture may be bonded to each other by fusing, adhesion or stitching in the form of an envelope, and the layer of the mixture may be sealed into between the upper and lower separation sheets in the form of an envelope.

When the mixture of the curable liquid molding resin and the light-weight filler particles contains gas (bubbles), the molded article surface and the fiber-reinforced resin layer are liable to have voids. It is therefore preferred to take care not to include non-coagulation gas such as air and nitrogen in the mixture or defoam the mixture by treating it under reduced pressure in advance.

For producing a composite molded article of which the deflection is small, it is preferred to mold a laminate having an additional (inner) reinforcement material locally within the core. In this case, the top and bottom of the reinforcement material are required to be connected to the top and bottom surface layer portions (skin portions), respectively. When the reinforcement material is disposed, it is proper, in continuous molding, to place reinforcement materials continuously at intervals of 30 mm to 150 mm along the length direction (machine direction). When the intervals are too large, the effect of the reinforcement materials is small. When the intervals are too small, a large volume of reinforcement materials are required, which results in an increase in the cost and the weight of the product.

In the continuous method, in the impregnation step, the laminate is centripetally pressed and centrifugally relaxed at least once each. In the above pressing and relaxation, has bubbles contained in the laminate are released, and at the same time, the curable liquid molding resin passes the separation sheets and infiltrates the above and bottom reinforcing fibrous sheets to fully wet the sheets, and part of the curable liquid molding resin reaches the vicinity of the top and bottom surfaces. The light-weight filler particles are prevented from moving by the separation sheets, and the particles and remaining resin form a uniform porous core.

The pressing and relaxation are preferably continuously carried out with at least one pair of rollers. At the time when, or after, the pressing is carried out, the laminate is introduced into the curing zone, where the laminate is heated up to a temperature equal to, or higher than, the curing temperature of the liquid molding resin while maintaining a flat (smooth) surface under proper plane pressure, to cure the resin.

Further, the laminate can be pressed and relaxed while the laminate is passed through a nip formed by at least one pair of upper and lower rollers which is arranged such that the central line of the laminate moves forming a wave form.

As a mechanism for imparting plane pressure in the curing zone, for example, there is provided a plurality of pairs of upper and lower rollers having a predetermined clearance along the movement course of the laminate which is to form a molded article, or a pair of upper and lower belt conveyers or wire-cloth conveyers which carries the laminate with holding the laminate between the upper and lower conveyors. The heating means in the curing zone can be selected as required. For example, a group of rollers or conveyors constituting the mechanism for imparting plane pressure in a molding portion may be heated, or far infrared heating, high-frequency heating or induction heating may be employed. Further, in addition to external heating, reaction heat generated by the curing of the resin may be utilized.

When the laminate is molded in a state where a flexible film or a metal plate is placed on one or both of the reinforcing fibrous sheets (outer surfaces), not only plane pressure can be more uniformly and effectively exerted on the laminate to improve the moldability, but also the conveying of thelaminate can be facilitated.

Further, when the laminate is centripetally pressed, a cord, a rope or the like may be provided for preventing the resin mixture from being forced out of the edges of the laminate.

There is accordingly formed a touch and light-weight composite molded article molded article having a sandwich structure formed of surface portions composed of a dense fiber-reinforced resin (FRP) and a uniform core layer composed of a cured resin containing numerous light-weight filler particles, and the molded article is continuously drawn out of the curing zone.

The composite molded article obtained by the molding according to the above continuous method is in a state of a lone (continuous-length) panel, and cut to a desired size as required to give the intended composite molded article.

The molding apparatus shown in FIGS. 1 and 2 will be briefly explained below.

Figure 1:
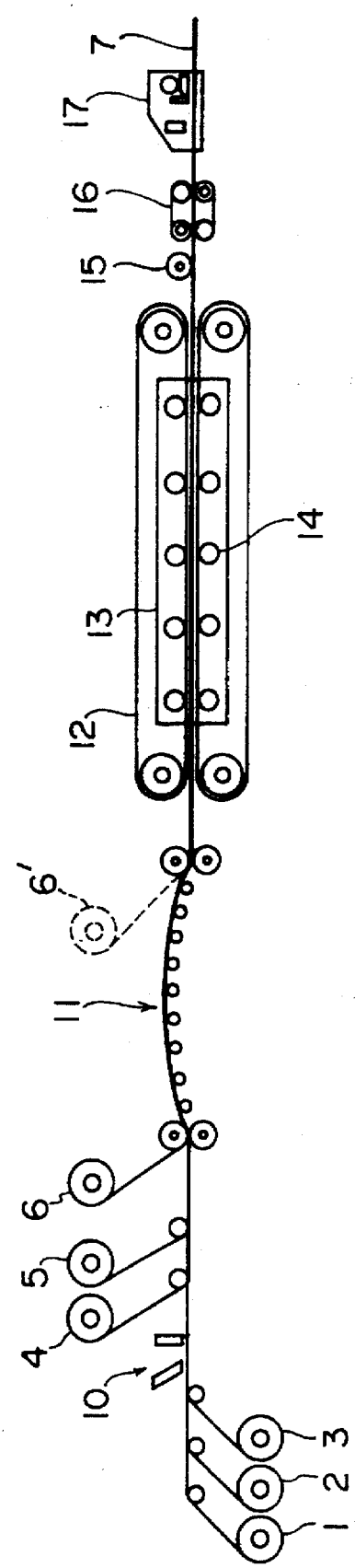
FIG. 1 schematically shows a molding apparatus used in one embodiment of the present invention.

FIG. 1 schematically shows a molding apparatus used for continuously carrying out the molding method of the present invention, and the molding apparatus may be modified or altered so long as the concept of the present invention is not altered.

In FIG. 1, two separation sheets (1,4), two reinforcing fibrous sheets (2,5) and two films are respectively continuously fed. The particles-containing mixture is continuously fed in between the upper and lower separation sheets through a feed port (10). In this manner, a laminate of reinforcing fibrous sheet/separation sheet/layer of the resinous mixture/separation sheet/reinforcing fibrous sheet is formed and introduced into a resin impregnation portion (11) as an impregnation zone. The impregnation portion (11) is structured such that the laminate runs on a number of rollers while forming a moderate arc. A pair of rollers is provided in the beginning of the impregnation portion (11), and another pair of rollers is provided in the end of the impregnation portion (11), as shown in FIG. 1, so as to apply tension to the laminate in the laminate running direction. In this manner, the laminate is centripetally pressed and centrifugally relaxed in the impregnation portion (11).

As shown in FIG. 1, the upper film may be fed from a position (6) before the impregnation portion (11) or from a position (6') in the end portion of the impregnation portion (11). In the impregnation portion (11), the curable liquid molding resin filtrates the reinforcing fibrous sheets through the separation sheets, and gas bubbles are smoothly removed.

In FIG. 1, the impregnated laminate from the impregnation zone (11) is fed into a curing (heating) furnace (13) as a molding (curing) zone. The curing furnace (13) is structured such that the impregnated laminate runs while being sandwiched between two steel belts (12) (combination of upper and lower endless belts). In the curing furnace (13), many support rolls (14) are provided. In the molding zone (curing furnace), the curable liquid molding resin is cured to form a composite molded article.

The continuous molding apparatus shown in FIG. 1 gives a lone (endless) composite molded article in the form of a sheet. The molded article is drawn by a drawing device (16) through a trimming cutter (15) so that the molded article is trimmed to have a proper width, and then cut to a desired length with a cutter (17).

Figure 2:
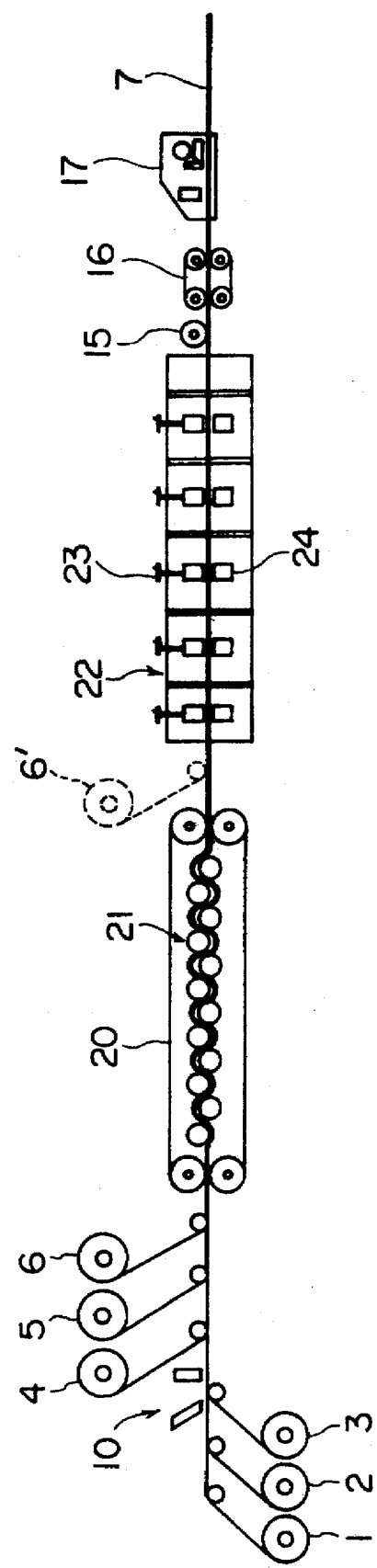
FIG. 2 schematically shows a molding apparatus used in another embodiment of the present invention.

In the continuous molding apparatus shown in FIG. 2, the laminate is formed by the same manner as those in FIG. 1. Then, the laminate is fed to an impregnation zone. In the impregnation zone in FIG. 2, many press rollers (21) are provided such that the laminate is conveyed in a corrugate form while being sandwiched between a pair of endless belts (20). That is, the laminate moves up and down along a zig-zag path. The laminate runs in a corrugate form through a set of many rollers, and while the laminate runs in this manner, the laminate is centripetally pressed and centrifugally relaxed repeatedly. In FIG. 2, the upper film for the laminate may be fed from a position (6) before the impregnation portion or from a position (6') in the end portion of the impregnation portion.

Figure 3A:
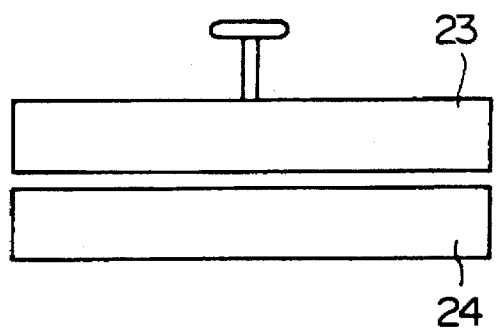
FIGS. 3A and 3B show examples of a die which has an upper shaping die member and a lower shaping die member and is provided in a curing (heating) furnace (22) in FIG. 2, seen from a site where a product is taken out. A shows a shaping die for producing a flat plate and B shows a shaping die for producing a corrugated plate.
Figure 3B:
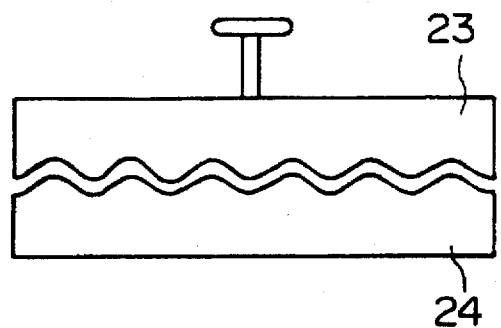

The impregnated laminate from the impregnation zone is introduced into a curing (heating) furnace (22) as a heating zone. In the molding zone (22), the impregnated laminate passes through a slit between each upper shaping die member (23) and each lower shaping die member (24) to be cured and shaped. The form of the slit formed between the upper shaping die member (23) and the lower shaping die member (24) determines the form of the composite molded article. FIGS. 3A and 3B show specific examples of the slit. FIG. 3A shows a shaping die for forming a composite molded article in the form of a flat plate, and FIG. 3B shows a shaping die for forming a composite mold article in the form of a corrugated plate.

The cured composite molded article from the molding zone runs through a trimming cutter (15) and a drawing device (16), and is cut to a desired size with a cutter (17), in the same manner as in the embodiment shown in FIG. 1.

Both the above batch method and the continuous method of the present invention has one characteristic feature in the use of the mixture of the rigid particles and the compressible particles as the light-weight filler particles which form the porous core layer. According to further investigation of the present inventors, it has been found that the continuous method gives the intended composite molded article even if the amount ratio of the compressible particles in the light-weight filler particles is very small, i.e., even if the rigid particles alone are used as the light-weight filler particles.

To the best of the present inventors' conventional knowledge, when rigid particles alone are used to form a syntactic layer for producing a composite molded article, it is difficult to release gas bubbles contained in a mixture of the particles and a curable liquid molding resin, and it is difficult to form a uniform porous layer having a high filling percentage by stable operation. In particular, when the rigid particles was used in the batch method, it was very difficult to obtain an excellent-quality composite molded article free of voids or pinholes. The reason therefor is not clear enough, while it is assumed that pressure is not accumulated in a mold due to the non-deformability of the rigid particles or that gas bubbles are not smoothly released since the pressure in the mold is not maintained. It is further assumed that the core portion has great shrinkage in molding since no porous layer having a high filling percentage is formed.

Nevertheless, it has been found that, according to the above continuous method, a composite molded article which is free of voids or pinholes and has a uniform porous layer substantially having no void can be unexpectedly obtained when rigid particles alone are used without the substantial use of the compressible particles. The impregnation step (c) is presumably a step suitable for releasing gas bubbles and forming a porous core having a high filling percentage of particles even if rigid particles alone are used. According to the present invention, therefore, there is also provided the following continuous method using rigid particles.

[III] Continuous method using rigid particles

In the production of a composite molded article in which a core portion of a porous resin layer is present between two surface portions of a fiber-reinforced resin and the whole of the composite molded article is integrated, the method for the production of the composite molded article including the following steps, (a) the mixture preparation step of preparing a particles-containing resinous mixture of a curable liquid molding resin with light-weight rigid particles having an average particle size of 0.01 to 2 mm, (b) the laminate preparation step of continuously feeding two separation sheets and two reinforcing fibrous sheets such that the two separation sheet are positioned between the two reinforcing fibrous sheets and continuously feeding the mixture prepared in the above step (a) into a space between the two separation sheets, to continuously prepare a laminate of a reinforcing fibrous sheet/separation sheet/layer of the resinous mixture in the above step (a)/separation sheet/ reinforcing fibrous sheet, (c) the impregnation step of centripetally pressing and centrifugally relaxing the laminate at least once each, thereby removing gas bubbles other than gas bubbles contained in the particles with infiltrating the curable liquid molding resin contained in the layer of the mixture into the reinforcing fibrous sheets through the separation sheets, and (d) the curing step of heating the laminate under pressure or under no pressure to cure the resin to form the composite molded article.

Like the curing step (d) in the continuous method [II], the curing step (d) in the continuous method [III] may be a curing step of partially curing the impregnated laminate by heating it under pressure or under no pressure, to obtain a partially cured composite material having shape retainability. The present invention includes the embodiment of the above partially curing step. This embodiment gives a partially cured intermediate composite molded article.

The above continuous method [III] is substantially the same as the continuous method [II] in raw materials, properties thereof and constitution thereof except that the rigid particles alone are substantially used as light-weight filler particles in place of the mixture of rigid particles and compressible particles used in the continuous method [II]. The continuous method [III] employs the same steps (a) to (d) as those in the continuous method [II]. The rigid particles used in the continuous method [III] are therefore the same as the rigid particles explained concerning the batch method [I] and the continuous method [II]. In the continuous method [III], the rigid particles, preferably inorganic rigid particles, are substantially used as light-weight filler particles, while the rigid particles may contain a small amount (e.g., 5% by volume or less) of other particles such as foaming particles or compressible particles.

As described above, the raw materials and the method in the continuous method [III] are as explained in detail concerning the batch method [I] or the continuous method [II] except that the continuous method [III] uses the rigid particles as light-weight filler particles, and the explanation thereof is omitted.

[IV] Properties of composite molded article

The composite molded article produced by any one of the above methods of the present invention is a molded article in which the uniform porous core layer containing light-weight filler particles at a high filling percentage is integrated in between the surface layers formed of the fiber-reinforced resin, and the composite molded article as a whole is light in weight and has a tough foamed core-sandwiched structure. Moreover, the composite molded article is substantially free of voids and pinholes and excellent in surface properties, and it is excellent in quality.

The composite molded article prepared by the present invention is therefore a light-weight molded article in the form of a plate, and it has a thickness of 1 to 100 mm, preferably 1.5 to 50 mm. It has a three-layered structure having top and bottom surface layers and a porous core layer therebetween, and has a characteristic feature in that each surface layer and the porous core layer have a clear boundary surface by the separation sheet when a cross section taken at right angles with the surface direction of the composite molded article is observed. The surface layer thickness (total of two layers)/porous layer thickness ratio is 2/1 to 1/50, preferably 2/1 to 1/30. This thickness ratio and the thickness of each layer are not necessarily required to be uniform as the whole of the composite molded article, or may partly vary.

The porous core layer of the composite molded article of the present invention has a relatively high filling percentage of the light-weight filler particles, and the ratio (volume ratio) of the light-weight filler particles in the porous layer is therefore high. The volume ratio of the light-weight filler particles is preferably 50 to 85%, particularly preferably 60 to 80%. As the amount ratio of the compressible particles in the light-weight filler particles increases, the above volume ratio generally increases.

The composite molded article is light in weight, and the average specific gravity thereof is in the range of from 0.2 to 1.2, preferably 0.25 to 1.0, particularly preferably 0.3 to 0.8.

The composite molded article of the present invention has the form of a plate. The thickness of the composite molded article is not required to be uniform as a whole, or the thickness may partly vary. When the composite molded article has a partly large thickness, the porous layer may have a larger thickness, or the surface layer(s) may have a larger thickness. Further, even if the average thickness of the composite molded article is substantially the same level, the apparent (surface, cross sectional) form of the plate is not required to be flat, and for example, the composite molded article may have a corrugate or have a protuberance or a dent.

The composite molded article obtained according to the method of the present invention is excellent in light-weight properties and toughness and has an excellent surface appearance. It can be therefore efficiently used in the fields of transportation vehicles and equipment, structural materials, interior and exterior decorative materials, medical equipment, electric communication equipment, sporting goods, and the like.

The present invention will be specifically explained hereinafter with reference to Examples, in which "part" stands for "part by weight" unless otherwise specified.

EXAMPLE 1

1.0 Part of benzoyl peroxide (BPO) and 0.4 part of cumene hydroperoxide (CHP) as curing agents and 0.6 part of dimethylaniline (DMA) as a cure promoter were added to, and fully mixed with, 100 parts of an unsaturated polyester resin ("Polylite" FG104N, supplied by Dainippon Ink & Chemicals, Inc.). Then, 7.8 parts of compressible particles ("Matsumoto Microsphere MFL100CA", supplied by Matsumoto Yushi-Seiyaku Co. Ltd, specific gravity 0.13, average particle diameter 0.1 mm) and 10.6 parts of rigid particles ("Glass Bubbles K-1", supplied by Sumitomo-3M Co., Ltd., specific gravity 0.125, particle diameter 0.1 to 1 mm) were added, and mixed with, the above mixture to prepare a particles-containing resinous mixture.

The compressible particles/rigid particles volume ratio in the above mixture was 41/59, and the curable liquid molding resin/light-weight filler particles volume ratio in the particles-containing resinous mixture was 39/61.

The above-prepared particles-containing mixture was molded with an apparatus as shown in FIG. 1. That is, the mixture was charged into a mixture feed port (10). While polyester films (3,6), reinforcing fibrous sheets ("Glassron CM305", glass fiber chopped strand mat, weight 300 g/m$^2$, supplied by Asahi Fiber Glass Co., Ltd) (2,5) and separation sheets ("Unisel BT0908W", polyester-containing non-woven fabric, weight 40 g/m$^2$, supplied by Unisel Co., Ltd) (1,4) were respectively set, and carried with a drawing device (16) at a rate of 0.5 m/minute, the mixture was fed such that the compression ratio (volume change ratio of compressible particles before and after shaping) of the compressible particles was 10%. The compressible particles/rigid particles volume ratio in the core portion was 39/61.

The above-shaped laminate of film/reinforcing fibrous sheet/separation sheet/particles-containing resinous mixture/separation sheet/reinforcing fibrous sheet/film was pressed with a roll and then fed into a resin impregnation portion (11) having a convex path upwardly. In this process, under pressure, the curable liquid molding resin in the particles-containing resinous mixture was squeezed out and infiltrated into the upper and lower reinforcing fibrous sheets (surface layers) through the separation sheets, and the laminate was inserted between steel belts (12) and introduced into a curing furnace (13) while its thickness was adjusted with support rolls (14). While the laminate was heated and passed through the curing furnace (13) at 130° C., the curable liquid molding resin was cured to give a composite molded article (7) having a syntactic foamed core layer. The molded article is cut to an intended length to give a panel.

The above-obtained composite molded article was a panel structure which was free of voids and undulation on its surface and excellent in surface properties and had a thickness of 10 mm. The composite molded article had a specific gravity of as extremely low as 0.63. (The specific gravity of the core portion was 0.53).

The above composite molded article was found to have excellent mechanical properties, a flexural strength of 5.1 kgf/mm$^2$ and a flexural modulus of 390 kgf/mm$^2$.

EXAMPLE 2

A curable liquid molding resin was prepared by mixing 100 parts of an epoxy resin ("Epicion 850" supplied by Dainippon Ink & Chemicals, Inc.) and 20 parts of a curing agent ("Epikure T", supplied by Yuka Shell Epoxy Kabushiki Kaisha). Then, 12 parts of compressible particles ("Matsumoto Microsphere MFL100CA", supplied by Matsumoto Yushi-Seiyaku Co. Ltd, specific gravity 0.13) and 27 parts of rigid particles (("Glass Bubbles K-1", supplied by Sumitomo 3M Co., Ltd., specific gravity 0.125) were added to, and mixed with, the above curable liquid molding resin to obtain a particles-containing resinous mixture.

In the above particles-containing resinous mixture, the compressible particles/rigid particles mixing ratio was 30/70 by volume, and the curable liquid molding resin/light-weight filler particles mixing ratio was 25/75 by volume.

The above-prepared particles-containing resinous mixture was molded with a continuous molding apparatus as shown in FIG. 2. That is, the particles-containing resinous mixture was charged into a mixture feed port (10) of the apparatus. Then, in the same manner as in Example 1, while polyester films (3,6), reinforcing fibrous sheets (2,5) and separation sheets (1,4) were respectively set, and drawn up with a drawing device (16), the mixture was fed such that the compression ratio of the compressible particles was 10%. The compressible particles/rigid particles volume ratio in the core portion was 28/72.

The above-shaped laminate of film/reinforcing fibrous sheet/separation sheet/particles-containing resinous mixture/separation sheet/reinforcing fibrous sheet/film was pressed and relaxed with a plurality of sets of press rollers (21) repeatedly to carry out degassing. At the same time, under pressure, the curable liquid molding resin in the particles-containing mixture of the laminate was squeezed out and infiltrated into the upper and lower reinforcing fibrous sheets (surface layers) through the separation sheets.

While the curable liquid molding resin fully exuded to the surface layer of the laminate, the thickness of the laminate was adjusted under roll pressure, and then the laminate was fed to a curing furnace (22) at 140° C. In the curing furnace (22), while the laminate was passed through a slit between a plurality of upper shaping die members (23) and a plurality of lower shaping die members (24) to adjust the thickness of a molded article to 6.0 mm, the curing of the curable liquid molding resin was completed, give a composite molded article (7) having a syntactic foamed core layer.

The above-obtained composite molded article was a panel structure which was free of voids and undulation on its surface and excellent in surface properties. The composite molded article had a specific gravity of as low as 0.57 (The specific gravity of the core portion was 0.38).

EXAMPLE 3

A resin liquid was prepared by 1.0 part of BPO and 0.4 part of CHP as curing agents and 0.4 part of DMA as a cure promoter to 100 parts of an unsaturated polyester resin ("Polylite FG104N", supplied by Dainippon Ink & Chemicals, Inc.). Then, 7.8 parts of compressible particles ("Matsumoto Microsphere MFL100CA", supplied by Matsumoto Yushi-Seiyaku Co., specific gravity 0.13) and 25.0 parts of rigid particles ("Glass Bubbles K-25", supplied by Sumitomo-3M Co., Ltd., specific gravity 0.25) were added to, and mixed with, 46.8 parts of the above resin liquid to obtain a particles-containing resinous mixture.

The above-prepared particles-containing resinous mixture was molded with an apparatus as shown in FIG. 1. That is, the mixture was charged into a mixture feed port (10). On the other hand, while the above resin liquid containing no light-weight filler particles was applied to a lower film (3) and infiltrated into a reinforcing fibrous sheet (2) laminated thereon, a separation sheet (1) was stacked. The particles-containing resinous mixture was fed onto the separation sheet through the mixture feed port (10) such that the compression ratio of the compressible particles was 10%. A separation sheet (4) and a reinforcing fibrous sheet (5) were laminated, the above resin liquid containing no light-weight filler particles was applied, and a film was stacked to give a laminate.

The laminate was roll-pressed such that it had a uniform thickness, and then, while the laminate was passed through a resin impregnation portion (11) having a convex form upwardly, it was pressed with the films vertically pressing, whereby the curable liquid molding resin within the laminate was infiltrated into the reinforcing fibrous sheets and unnecessary gas bubbles were removed out of the system.

The laminate for which the impregnation was finished was introduced into a curing furnace (13) at 120° C. while it was inserted between steel belts, and the curing of the liquid molding resin was completed to give a composite molded article (7) having a syntactic foamed core.

The above composite molded article had a specific gravity of 0.68 and it was found to be light in weight. The specific gravity of the core portion of the composite molded article was 0.59, and the compressible particles/rigid particles mixing ratio in the core portion was 38/65 by volume.

EXAMPLE 4

The same particles-containing resinous mixture containing an epoxy resin, compressible particles and rigid particles as that used in Example 2 was used. Polyester films (3,6), reinforcing fibrous sheets (2,5) and separation sheets (1,4) were set in a continuous molding apparatus as shown in FIG. 2, and a laminate was formed in the same manner as in Example 2.

Then, in the same manner as in Example 2, the laminate was passed through a plurality of sets of press rollers (21) to remove unnecessary gas bubbles and infiltrate part of the curable liquid molding resin contained in the particles-containing resinous mixture into the reinforcing fibrous sheets through the separation sheets.

After the above impregnation step, the temperature of a curing furnace was set at 50° C., the laminate in a state in which it was sandwiched between films was drawn with a drawing apparatus (16) through slits between upper and lower shaping die members (23,24) while the thickness of the laminate was adjusted.

The so-obtained laminate was in a partially cured state, or a so-called partially cured composite molded article. This partially cured composite molded article was storable in a cold dark place (at room temperature if for a short period of time). After stored, it was cut to an intended size, and the resultant article was set in a mold and heated under pressure by a conventional molding method to complete the curing, whereby an excellent composite molded article having a syntactic foamed core was obtained.

EXAMPLE 5

1.0 Part of benzoyl peroxide (BPO) and 0.4 part of cumene hydroperoxide (CHP) as curing agents and 0.6 part of dimethylaniline (DMA) as a cure promoter were added to, and fully mixed with, 100 parts of an unsaturated polyester resin ("Polylite" FG104N, supplied by Dainippon Ink & Chemicals, Inc.). Then, 7.8 parts of compressible particles ("Matsumoto Microsphere MFL100CA", supplied by Matsumoto Yushi-Seiyaku Co. Ltd, specific gravity 0.13, average particle diameter 0.1 mm) and 10.6 parts of rigid particles ("Glass Bubbles K-1", supplied by Sumitomo 3M Ltd., specific gravity 0.125, particle diameter 0.1 to 1 mm) were added, and mixed with, the above mixture to prepare a particles-containing resinous mixture.

In the particles-containing resinous mixture, the compressible particles/rigid particles volume ratio was 41/59, and the curable liquid molding resin/light-weight filler particles volume ratio was 39/61.

The above particles-containing resinous mixture was weighed in such an amount that the compression ratio of the compressible particles would be 44% by volume based on a rectangular mold (830 mm×553 mm×7.5 mm-t: cavity volume=3,442 cm³). Outside the mold, the weighed particles-containing resinous mixture was applied to a laminate of reinforcing fibrous sheet ("Glassron CM305", supplied by Asahi Fiber Glass Co., Ltd, glass fiber chopped strand mat, weight 300 g/m²)/separation sheet ("Unisel BT0908W", supplied by Unisel Co., Ltd, polyester-containing unwoven fabric, weight 40 g/m²) to form a layer having a nearly uniform thickness, and the same separation sheet as above and the same reinforcing fibrous sheet as above were laminated on the layer in this order to form a laminate of reinforcing fibrous sheet/separation sheet/particles-containing resinous mixture/separation sheet/reinforcing fibrous sheet.

Then, the laminate was vertically pressed to infiltrate the curable liquid molding resin into the outer reinforcing fibrous sheet layers through the upper and lower separation sheets, and then set a lower mold member preheated at 100° C. An upper mold member was slowly covered to press the laminate under contact pressure, and stepwise pressed and relaxed in such a manner that the pressure decrease caused by filling with the curable liquid molding resin was compensated. Then, the mold was allowed to stand for 6 minutes while it was completely closed.

The so-obtained composite molded article having a thickness of 7.5 mm and having a sandwiched structure having a syntactic foamed core had neither voids nor undulation and thus showed excellent surface properties.

The molded article had a specific gravity of 0.72, and thus it was also excellent in light-weight properties. The specific gravity of the core portion of the molded article was 0.59.

Further, the above composite molded article had a flexural strength of 6.0 kgf/mm² and a flexural modulus of 460 kgf/mm², and it had excellent mechanical properties.

EXAMPLE 6

100 Parts of a phenolic resin ("Dislic 106" supplied by Dainippon Ink & Chemicals, Inc.) was fully mixed with 10 parts of a curing agent ("Dislic 102C" supplied by Dainippon Ink & Chemicals, Inc.). Then, 6.0 parts of compressible particles (hollow particles having a particle diameter of 0.02 to 0.05 mm and a specific gravity of 0.05, obtained by expanding "Matsumoto Microsphere TEM-8" supplied by Matsumoto Yushi-Seiyaku Co. Ltd. about 20 times under heat in an oven) and 8.5 parts of rigid particles ("Glass Bubbles K-1", supplied by Sumitomo 3M, Ltd., specific gravity 0.125, particle diameter 0.1 to 1 mm) were added to, and mixed with, the above resin to obtain a particles-containing resinous mixture.

In the particles-containing resinous mixture, the compressible particles/rigid particles volume ratio was 64/36, and the curable liquid molding resin/light-weight filler particles volume ratio was 33/67.

The above particles-containing resinous mixture was weighed in such an amount that the compression ratio of the compressible particles would be 40% by volume based on a rectangular mold (300 mm×210 mm×10 mm-t: cavity volume=630 cm³). A laminate of reinforcing fibrous sheet/separation sheet/particles-containing resinous mixture/separation sheet/reinforcing fibrous sheet was formed from the weighed particles-containing resinous mixture, reinforcing fibrous sheets ("Glassron CM455", supplied by Asahi Fiber Glass Co., Ltd., glass fiber chopped strand mat, weight 450 g/m²) and separation sheets ("Unisel BT0908W", supplied by Unisel Co., Ltd., weight 40 g/m²) in the same manner as in Example 5. This laminate was set in the mold preheated at 70° C. and pressed and relaxed repeatedly to fully impregnate the upper and lower reinforcing fibrous sheets with the curable liquid molding resin, and the mold was closed. The curable resin was cured by allowing the mold to stand for 10 minutes, then the mold was opened and a molded article was taken out.

The so-obtained composite molded article having a thickness of 10 mm and having a sandwiched structure having a syntactic foamed core had neither voids nor undulation and showed excellent surface properties. The molded article had a specific gravity of 0.66 and was thus light in weight.

EXAMPLE 7

A particles-containing preliminary resinous mixture was prepared by mixing 8.5 parts of compressible particles ("15P", polypropylene foam particles, supplied by JSP, average particle diameter 2 mm, specific gravity 0.08) and 11.1 parts of rigid particles ("Glass Bubbles K-1", supplied by Sumitomo 3M Co., Ltd., specific gravity 0.125, particle diameter 0.1–1 mm) with 70 parts of an unsaturated polyester resin ("Polylite FG801", supplied by Dainippon Ink & Chemicals, Inc.). The preliminary mixture contained no radical initiator, nor did it undergo separation of the light-weight particles and the curable liquid molding resin. It was therefore a stable mixture when stored.

For molding a composite molded article, a mixture of 30 parts of the same unsaturated polyester resin as the above and 0.3 part of an initiator ("Kayaester 0-50", supplied by Kaya Akzo Corp.) was added to, and fully mixed with, the above particles-containing preliminary resinous mixture to prepare particles-containing moldable (curable) mixture.

In this Example, the compressible particles/rigid particles mixing ratio was 54/46 by volume, and the curable liquid molding resin/light-weight filler particles mixing ratio was 31/69 by volume.

The above particles-containing resinous mixture was weighed in such an amount that the compression ratio of the compressible particles would be 53% by volume based on the same mold as that used in Example 6. A laminate of reinforcing fibrous sheet/separation sheet/particles-containing curable mixture/separation sheet/reinforcing fibrous sheet was formed from the weighed particles-containing curable mixture, reinforcing fibrous sheets ("Glassron CM305", supplied by Asahi Fiber Glass Co., Ltd., glass fiber chopped strand mat, weight 300 g/m²) and separation sheets ("Unisel BT0908W", supplied by Unisel Co., Ltd, weight 40 g/m²) in the same manner as in Example 5. This laminate was set in the mold preheated at 130° C., and pressed and relaxed, followed by curing and molding by closing the mold and maintaining it for 7 minutes. The so-obtained sandwich-structured composite molded article (a thickness of 10 mm) having a syntactic foamed core had neither voids nor undulation and showed excellent surface properties. The molded article had a specific gravity of 0.63 and was thus light in weight.

EXAMPLE 8

100 Parts of an epoxy resin ("Epikote 828", supplied by Yuka Shell Epoxy Kabushiki Kaisha) and 22 parts of a curing agent ("Epikure Z", supplied by Yuka Shell Epoxy Kabushiki Kaisha) were mixed at room temperature. Then, 3.3 parts of compressible particles ("Matsumoto Microsphere F80ED" supplied by Matsumoto Yushi-Seiyaku Co. Ltd., specific gravity 0.02, particle diameter 0.02 to 0.08 mm) and 4.8 parts of rigid particles ("Glass Bubbles K-1", supplied by Sumitomo 3M Ltd., specific gravity 0.125) were added to, and mixed with, the above mixture to obtain a particles-containing resinous mixture.

In the above particles-containing resinous mixture, the compressible particles/rigid particles mixing ratio was 81/19 by volume, and the curable liquid molding resin/light-weight filler particles mixing ratio was 34/66 by volume.

The above particles-containing resinous mixture was weighed in such an amount that the compression ratio of the compressible particles would be 50% by volume based on the same mold as that used in Example 5. A laminate of reinforcing fibrous sheet/separation sheet/particles-containing resinous mixture/separation sheet/reinforcing fibrous sheet was formed in the same manner as in Example 5. This laminate was set in the mold preheated at 140° C., and pressed and relaxed, followed by curing and molding by closing the mold and maintaining it for 10 minutes.

The so-obtained sandwich-structured composite molded article having a syntactic foamed core had excellent surface properties. The molded article had a specific gravity of 0.69 and was thus light in weight. (The specific gravity of the core portion was 0.56.)

The above composite molded article had a flexural strength of 6.6 kgf/mm$^2$ and a flexural modulus of 440 kgf/mm$^2$, and it had excellent mechanical properties.

EXAMPLE 9

100 Parts of an epoxy resin ("Epicon 850", supplied by Dainippon Ink & Chemicals, Inc.), 31.7 parts of a curing agent ("Epikure 113", supplied by Yuka Shell Epoxy Kabushiki Kaisha) and 1.0 part of a cure promoter (boron trifluoride monoethylamine) were mixed at room temperature. Then, 8.4 parts of compressible particles (hollow particles prepared by expanding "Matsumoto Microsphere TEM-8" supplied by Matsumoto Yushi-Seiyaku Co. Ltd. in an oven, specific gravity 0.05) and 25.2 parts of rigid particles ("Glass Bubbles K-37", supplied by Sumitomo 3M Ltd., specific gravity 0.37) were added to, and mixed with, the above mixture to prepare a particles-containing resinous mixture.

In the above particles-containing resinous mixture, the compressible particles/rigid particles mixing ratio was 50/50 by volume, and the curable liquid molding resin/light-weight filler particles mixing ratio was 45/55 by volume.

The above particles-containing resinous mixture was weighed in such an amount that the compression ratio of the compressible particles would be 50% by volume based on the same mold as that used in Example 5. A laminate of reinforcing fibrous sheet/separation sheet/particles-containing resinous mixture/separation sheet/reinforcing fibrous sheet was formed from the above particles-containing mixture and the same reinforcing fibrous sheets and the same separation sheets as those used in Example 5. The laminate was free of excessive sticking nature and was excellent in handling properties when molded.

The above laminate was set in the mold preheated at 140° C., and pressed and relaxed, followed by curing and molding by closing the mold and maintaining it for 6 minutes.

The so-obtained sandwich-structured composite molded article having a syntactic foamed core had excellent surface properties. The molded article had a specific gravity of 0.85 and was thus light in weight.

EXAMPLE 10

A particles-containing resinous mixture was prepared by mixing 1.0 part of BPO and 0.4 part of CHP as curing agents and 0.4 part of DMA as a cure promoter to 100 parts of an unsaturated polyester resin ("Polylite FG104N", supplied by Dainippon Ink & Chemicals, Inc.) and then adding 16 parts of compressible particles ("Matsumoto Microsphere MFL100CA", supplied by Matsumoto Yushi-Seiyaku Co. Ltd., specific gravity 0.13) and 20 parts of rigid particles ("Glass Bubbles K-25", supplied by Sumitomo-3M Co., Ltd., specific gravity 0.25).

In the above particles-containing resinous mixture, the compressible particles/rigid particles mixing ratio was 61/39 by volume, and the curable liquid molding resin/light-weight filler particles mixing ratio was 30/70 by volume.

The above particles-containing resinous mixture was weighed in such an amount that the compression ratio of the compressible particles would be 40% by volume based on a rectangular mold (300 mm×2103 mm×30 mm-t: cavity volume=1,890 cm$^3$). The weighed particles-containing resinous mixture was applied to a laminate of two reinforcing fibrous sheets ("Glassron CM305", supplied by Asahi Fiber Glass Co., Ltd., glass fiber chopped strand mat, weight 300 g/m$^2$) and one separation sheet ("Unisel BT0908W", supplied by Unisel Co., Ltd., polyester-containing non-woven fabric, weight 40 g/m$^2$), and then one separation sheet and two reinforcing fibrous sheets were stacked thereon. This laminate was set in the above mold preheated at 80° C. and pressed and relaxed repeatedly to infiltrate the curable liquid molding resin to the reinforcing fibrous sheets through the separation sheets, and the mold was closed. The curing reaction was finished by maintaining the laminate in this state for 10 minutes, to give a composite molded article.

The so-obtained 30 mm thick molded article was free of cracking or discoloration in the core portion, and it was also free of voids or undulation and thus had excellent surface properties. The mold article had a specific gravity of as low as 0.63. The specific gravity of the core portion of the molded article was 0.57.

EXAMPLE 11

This Example shows the method of producing a light-weight composite molded article having an integrated rib structure.

A particles-containing resinous mixture was prepared by mixing 1.0 part of BPO and 0.4 part of CHP as curing agents and 0.4 part of DMA as a cure promoter to 100 parts of an unsaturated polyester resin ("Polylite PS-281N", supplied by Dainippon Ink & Chemicals, Inc.) and then adding 20.4 parts of compressible particles ("Matsumoto Microsphere MFL100CA", supplied by Matsumoto Yushi-Seiyaku Co. Ltd.) and 13.1 parts of rigid particles ("Glass Bubbles K-1", supplied by Sumitomo 3M Ltd.).

In the above particles-containing resinous mixture, the compressible particles/rigid particles mixing ratio was 60/40 by volume, and the curable liquid molding resin/light-weight filler particles mixing ratio was 25/75 by volume.

On the other hand, for preparing a resin composition for a rib structure, 100 parts of the same unsaturated polyester resin as the above, 1.0 part of BPO, 0.4 part of CHP and 0.4 part of DMA were mixed, and 221.8 parts of a glass fiber powder (Powder PFA-101, supplied by Nitto Boseki Co. Ltd.) was further added to prepare a resin composition for a rib. In this resin composition, the curable liquid molding resin/glass fiber filler mixing ratio was 50/50 by volume.

The above resin composition for a rib was charged into a rib structure portion of a mold designed to integrate a rib structure (a concave portion corresponding to the rib structure as a lower mold member) and preheated at 100° C., and immediately thereafter, a reinforcing fibrous sheet ("Glassron CM305", supplied by Asahi Fiber Glass Co., Ltd., glass fiber chopped strand mat, weight 300 g/m$^2$) and one separation sheet ("Unisel BT0908W", supplied by Unisel Co., Ltd., polyester-containing non-woven fabric) were set. The above particles-containing resinous mixture was charged in such an amount that the compression ratio of the compressible particles was 45% by volume, and further, a separation sheet and a reinforcing fibrous sheet were stacked. The resultant laminate was pressed and relaxed, and the mold was closed and maintained for 10 minutes.

The form of the above-obtained composite molded article with the rib structure integrated and the form of the rib structure were as follows. The molded article had an apparent specific gravity of 0.68 (the specific gravity of its panel portion was 0.67), and it was found that a light-weight molded article having improved rigidity was obtainable by introducing a rib structure.

Form of composite molded article

Total thickness=5.0 mm

Width=210 mm

Length=300 mm

Thickness of core portion=4.04 mm

Thickness of surface layer portions (total of top and bottom)=0.48 mm

Form of rib (integrated into central portion of molded article along the length direction)

Cross-sectional form: trapezoidal

Width of the base: 2.7 mm

Width of the upper side: 2.0 mm

Height: 4.0 mm

Length: 300 mm

EXAMPLE 12

This Example used a molding apparatus having many pairs of control rollers (width 400 mm) provided such that the intervals were 10 mm, that the upper portion length was 700 mm and that the lower portion length was 1,000 mm, plate-shaped heaters for heating them and upper and lower steel plates holding a laminate therebetween.

The dimension of the above stainless steel plate was 400 mm×1,800 mm×1.5 mm-t.

A particles-containing resinous mixture was prepared by mixing 20 parts of a curing agent ("Epikure T", supplied by Yuka Shell Epoxy Kabushiki Kaisha) with parts of an epoxy resin ("Epicion 850", supplied by Dainippon Ink & Chemicals, Inc.) to obtain a curable liquid molding resin, and adding 5 parts of compressible particles ("Matsumoto Microsphere MFL100CA" supplied by Matsumoto Yushi-Seiyaku Co. Ltd) and 10 parts of rigid particles ("Glass Bubbles K-1", supplied by Sumitomo 3M Ltd.) to the curable liquid molding resin.

Polyethylene terephthalate ("Tetoron film type S31", supplied by Teijin Ltd., 25 μm), a reinforcing fibrous sheet ("CM455" supplied by Asahi S Fiber Glass Co., Ltd.) and a separation sheet ("Unisel BT0908W", supplied by Unisel Co., Ltd, polyester-containing unwoven fabric) were stacked on the lower steel plate to form a 300 mm width laminate of polyethylene terephtalate film/reinforcing fibrous sheet/separation sheet, and the above particles-containing resinous mixture was nearly uniformly spread over the laminate. Then, four braided glass-fiber strands (diameter 6 mm) were placed in the longitudinal direction at intervals of 70 mm.

Further, a separation sheet, a reinforcing fibrous sheet and a polyethylene terephthalate film were stacked thereon, and the upper steel plate was stacked.

The above-prepared laminate sandwiched between the steel plates was carried through nips formed by the rolls in the above apparatus under heat at 140° C. at a rate of 70 mm/minute. After the so-treated laminate was cooled, the steel plates and the films were removed to give a composite molded panel having a size of 300 mm×1,200 mm×7.0 mm-t and having a syntactic foamed core in which the core portion was partly reinforced with the braided strands. Rectanglar-shaped test pieces was cut and taken from the obtained molded article such that the braided strand-inserted portion was located in the central portion, and measured for flexural properties. Table 1 shows the results.

Further, a composite molded article having a syntactic foamed core was produced in the same manner as the above while using no braided strand of glass fiber. The composite molded article was measured for flexural properties, and Table 1 also shows the results.

TABLE 1

|  | With braided strand | Without braided strand |
| --- | --- | --- |
| Flexural strength (kgf/cm$^2$) | 13.5 | 7.7 |
| Flexural modulus (kgf/cm$^2$) | 710 | 590 |

EXAMPLE 13

A polyethylene terephthalate film ("Tetoron film Type D", supplied by Teijin Ltd., thickness 25 μm) as a flexible film was set in each of 3 and 6 in FIG. 2, a glass mat ("CM305-300", supplied by Asahi Fiber Glass Co., Ltd, weight 300 g/m$^2$) as a reinforcing fibrous sheet was set in each of 2 and 5 in FIG. 2, and a polyester-containing unwoven fabric (("Unisel BT0908W", supplied by Unisel Co., Ltd, weight 40 g/m$^2$) as a separation sheet was set in each of (1) and (4) in FIG. 2.

Further, a curable liquid molding resin was prepared by mixing 100 parts of an unsaturated polyester resin ("Polylite FC104N", supplied by Dainippon Ink & Chemicals, Inc.) and 2 parts of a curing agent ("Permek N", supplied by Nippon Oil & Fats Corp.), and further, 11 parts of rigid particles ("Glass Bubbles K-1", supplied by Sumitomo 3M Ltd, specific gravity 0.125) was added to, and mixed with, the above mixture to prepare a particles-containing resinous mixture.

The above particles-containing resinous mixture was molded with the molding apparatus as shown in FIG. 2. That is, the above mixture was set in a mixture feed port (10), and continuously applied to a laminate of film/reinforcing fibrous sheet/separation sheet with a drawing device (16) to form a coating having a uniform thickness, and a separation sheet, a reinforcing fibrous sheet and a film were consecutively stacked thereon, to form a laminate.

The above-obtained laminate was fed into an impregnation/degassing portion, pressed with sets of press rollers and under tension of the films, whereby the curable liquid molding resin was squeezed out through the separation sheets to infiltrate it into the upper and lower reinforcing fibrous sheets (glass mats) and part of it was allowed to reach close to each surface portion. The laminate was adjusted to a thickness of 5 mm with a pair of upper and lower rollers provided at an end portion of the impregnation/degassing portion, and then carried into a curing portion.

The curing portion was composed of a curing furnace (22), and an upper shaping die member (23) and a lower shaping die member (24) for controlling the laminate thickness. While the introduced laminate was thickness-adjusted in a state in which it was covered with the films, the laminate was cured under heat at 130° C. to form a composite molded article. The molded article from the curing portion was trimmed (15) in both edges and cut with a movable cutter (17) to intended lengths.

The so-obtained molded article was a sandwich-structured light-weight molded article in which the core portion was formed of a syntactic foam and each of the top and bottom surface portions was formed of a fiber-reinforced resin layer. The molded article had a specific gravity of 0.77. The molded article had a flexural strength of 7.9 kgf/mm$^2$ and a flexural modulus of 610 kgf/mm$^2$.

EXAMPLE 14

A particles-containing resinous mixture was prepared by mixing 100 parts of an epoxy resin ("Epicion 850", supplied by Dainippon Ink & Chemicals, Inc.) as a curable liquid molding resin with 20 parts of a curing agent ("Epikure T", supplied by Yuka Shell Epoxy Kabushiki Kaisha), and adding 15 parts of rigid particles ("Glass Bubbles K-1", supplied by Sumitomo 3M Ltd., specific gravity 0.125).

In the above particles-containing resinous mixture, the curable liquid molding resin/rigid particles mixing ration was 48/54 by volume.

An apparatus as shown in FIG. 1 was used. The same polyethylene terephthalate films (3,16) as those used in Example 13, as a flexible film, glass mats ("CM455", supplied by Asahi Fiber Glass Co., Ltd, weight 450 g/m$^2$) (2,5) and the same polyester-containing non-woven fabrics as those used in Example 13, as separation sheets, were respectively set.

The above particles-containing mixture was continuously fed through a mixture feed port of the apparatus shown in FIG. 1 to form a coating having a uniform thickness, to form a laminate of film/reinforcing fibrous sheet/separation sheet/particles-containing resinous mixture/separation sheet/reinforcing fibrous sheet/film in the same manner as in Example 13. While the laminate was passed through nips formed by a plurality of sets of rollers provided in an upward convex form in a resin impregnation portion (11), the laminate was film-pressed to infiltrate the curable liquid molding resin into the reinforcing fibrous sheet layer on the top surface layer side through the separation sheet. The thickness of the laminate was adjusted by rolls provided in an end portion of the impregnation portion, and the laminate was introduced into a curing portion.

The curing portion was composed of steel belts (12) for vertically continuously holding the laminate therebetween, a curing furnace (13) (temperature-adjusted to 140° C. in this Example) and rolls for supporting and conveying the above laminate and the steel belts. While the introduced laminate was thickness-adjusted with being sandwiched by the steel belts, it was cured under heat to give a molded article.

The molded article from the curing portion was trimmed with a trimming cutter (15) and cut with a movable cutter (17) to intended sizes.

The above-obtained sandwich-structured molded article having a syntactic foamed core had a specific gravity of 0.77, and it was found to be a light-weight composite molded article.

EXAMPLE 15

A particles-containing resinous mixture was prepared by mixing 100 parts of an unsaturated polyester resin ("Polylite PS281", supplied by Dainippon Ink & Chemicals, Inc.) as a curable liquid molding resin, 1.0 part of BPO and 0.4 part of CHP as curing agents and 0.4 part of DMA as a cure promoter, and further adding 70 parts of rigid particles ("Glass Bubbles K-20", supplied by Sumitomo 3M Ltd., specific gravity 0.20).

In the above particles-containing mixture, the curable liquid molding resin/light-weight filler particles mixing ratio was 20/80 by volume.

In a continuous molding apparatus shown in FIG. 2, a film (3) and a separation sheet (1) on the lower side were taken out, the above particles-containing resinous mixture was fed onto the separation sheet through a mixture feed port (10) and spread in the form of a sheet, and a separation sheet (4) and a film (6) on an upper side were stacked to form a laminate of film/separation sheet/particles-containing resinous mixture/separation sheet/film (no reinforcing fibrous sheet was used).

The above laminate was introduced into a resin impregnation portion composed of a plurality of sets of press rollers (21) to remove unnecessary gas bubbles in the laminate and to infiltrate and integrate the curable liquid molding resin in the particles-containing resinous mixture into/with the upper and lower separation sheets. The laminate was adjusted to a thickness of 5 mm by passing it through a nip formed by rolls capable of controlling the thickness of the laminate.

Then, while the above laminate of the separation sheets and the particles-containing resinous mixture was vertically pressed with the films, the laminate was passed through a slit of unheated upper and lower shaping die members to give a laminate of film/separation sheet/particles-containing resinous mixture/separation sheet/film in a state in which the curable liquid molding resin was not cured, i.e., a molding material for producing a composite molded article. The molding was cut with a trimming cutter (15) and a movable cutter (17) to intended sizes.

For preventing the vaporization of styrene monomer as a crosslinking agent, the above molding material with the films covering the top and bottom surfaces was encased and stored in a bag of a film free of gas permeability.

One embodiment of forming a light-weight composite molded article from the above molding material will be described below.

A glass fiber chopped strand mat ("CM-305", supplied by Asahi Fiber Glass Co., Ltd., weight 300 g/m$^2$) was placed in a flat-plate mold having a size of 210 mm×300 mm×6 mm-t (thickness adjustable with spacer), and 20 parts of the same resin liquid (curable liquid molding resin, curing agent and cure promoter) was fed thereon. Then, the above laminate which had been stored in the bag was cut to a predetermined size and stacked on the resin liquid after the films were peeled off. Further, the same chopped strand mat as the above and the resin liquid (20 parts) were fed, and the mold was closed to press the resultant laminate, whereby the curable liquid molding resin was uniformly infiltrated into the reinforcing fibrous sheets in the mold.

The temperature of the mold was increased to 110° C., and this temperature was maintained for 10 minutes to complete the curing. The resultant sandwich-structured composite molded article (6 mm thick) having a syntactic foamed core had a specific gravity of as low as 0.60, and it also had excellent surface properties.

Further, a 11 mm thick sandwich-structured composite molded article having a syntactic foamed core was obtained in the same manner as the above except that the spacer was replaced with other one so that the mold gave a molded article having a thickness of 11 mm, and that one laminate (molding material) used for molding the above 6 mm thick molded article was replaced with two sheets of the laminates. The so-obtained molded article had a specific gravity of as low as 0.51.

EXAMPLE 16

A particles-containing resinous mixture was prepared by mixing 100 parts of an epoxy resin ("Epicion 850", supplied by Dainippon Ink & Chemicals, Inc.) with 22 parts of a curing agent ("Epikure Z", supplied by Yuka Shell Epoxy Kabushiki Kaisha), and adding 30 parts of rigid particles ("Glass Bubbles K1", supplied by Sumitomo 3M Ltd., specific gravity 0.125).

In the above particles-containing mixture, the curable liquid molding resin/rigid particles mixing ratio was 30:70 by volume.

In a continuous molding apparatus as shown in FIG. 2, films (3,6), reinforcing fibrous sheets (300 g/m$^2$) (2,5) and separation sheets (40 g/m$^2$) (1,4) were set, and a laminate was formed in the same manner as in Example 13.

The above laminate was passed through nips formed by a group of press rollers (21) to remove unnecessary gas bubbles and to infiltrate and integrate part of the curable liquid molding resin in the particles-containing resinous mixture into/with the reinforcing fibrous sheets through the separation sheets.

In the final stage of the above impregnation step, the laminate was thickness-adjusted with press rollers, and introduced into a curing furnace. The temperature in the curing furnace was set at 50° C. in this Example, and in this zone, the curable resin was altered to a partially cured state to give a so-called partially cured composite material.

The above partially cured composite material was storable in a cold dark place. After stored, it was cut to an intended size, and the resultant material was molded by a conventional molding method to complete the curing, whereby a composite molded article having a syntactic foamed core was obtained.

EXAMPLE 17

A particles-containing resinous mixture was prepared by mixing 100 parts of an unsaturated polyester resin ("Polylite PS281", supplied by Dainippon Ink & Chemicals, Inc.) as a curable liquid molding resin, 1.0 part of BPO and 0.4 part of CHP as curing agents and 0.4 part of DMA as a cure promoter, and further adding 10.6 parts of compressible particles ("Matsumoto Microsphere MFL100CA" supplied by Matsumoto Yushi- Seiyaku Co. Ltd, specific gravity 0.13) and 30.5 parts of rigid particles ("Glass Bubbles K-2.5", supplied by Sumitomo 3M Ltd., specific gravity 0.25).

In the above particles-containing resinous mixture, the curable liquid molding resin/rigid particles mixing ratio was 30:70 by volume, and the compressible particles/rigid particles mixing ratio was 40/60 by volume.

In a continuous molding apparatus shown In FIG. 2, a film (3) and a separation sheet (1) on the lower side were taken out, the above particles-containing resinous mixture was fed onto the separation sheet through a mixture feed port (10) and spread in the form of a sheet, and a separation sheet (4) and a film (6) on an upper side were stacked to form a laminate of film/separation sheet/particles-containing resinous mixture/separation sheet/film. In this stage, no reinforcing fibrous sheet was used.

The above laminate was introduced into a resin impregnation portion composed of a plurality of sets of press rollers (21) to remove unnecessary gas bubbles in the laminate and to infiltrate and integrate the curable liquid molding resin in the particles-containing resinous mixture into/with the upper and lower separation sheets. The laminate was adjusted to a thickness of 5 mm by passing it through a nip formed by rollers capable of controlling the thickness of the laminate.

Then, while the above laminate of the separation sheets and the particles-containing mixture was vertically pressed with the films, the laminate was passed through a slit of unheated upper and lower shaping die members to give a laminate of film/separation sheet/particles-containing resinous mixture/separation sheet/film in a state in which the curable liquid molding resin was not cured, i.e., a molding material for producing a composite molded article. The molding material was cut with a trimming cutter (15) and a movable cutter (17) to intended sizes.

For preventing the vaporization of styrene monomer as a crosslinking agent, the above molding material with the films covering the top and bottom surfaces was encased and stored in a bag of a film free of gas permeability.

One embodiment of forming a light-weight composite molded article from the above molding material will be described below.

A glass fiber chopped strand mat ("CM-455", supplied by Asahi Fiber Glass Co., Ltd., weight 450 g/m$^2$) was placed in a flat-plate mold having a size of 210 mm×300 mm×6 mm-t (thickness adjustable with spacer), and the above laminate which had been stored in the bag was cut to a predetermined size and stacked thereon after the films were peeled off. Further, the same chopped strand mat as the above was placed, and the mold was closed to press the resultant laminate, whereby the curable liquid molding resin was uniformly infiltrated into the reinforcing fibrous sheets in the mold.

The temperature of the mold was increased to 110° C., and this temperature was maintained for 10 minutes to complete the curing. The resultant sandwich-structured composite molded article (6 mm thick) having a syntactic foamed core had a specific gravity of as low as 0.62, and it also had excellent surface properties. (The specific gravity of the core portion was 0.41).

What is claimed is:

1. A process for the production of a composite molded article in which a core portion of a porous resin layer is present between surface portions of a fiber-reinforced resin and the whole of the composite molded article is integrated, the process comprising the following steps, (a) the mixture preparation step of preparing a particles-containing resinous mixture of a curable liquid molding resin with light-weight filler particles having an average particle size of 0.01 to 2 mm, the light-weight filler particles being a mixture of rigid particles and compressible particles, (b) the laminate preparation step of preparing a laminate of a reinforcing fibrous sheet/separation sheet/layer of the resinous mixture in the above step (a)/separation sheet/reinforcing fibrous sheet, (c) the impregnation step of centripetally pressing and centrifugally relaxing the laminate at least once each, thereby removing gas bubbles other than gas bubbles contained in the particles with infiltrating the liquid molding resin contained in the layer of the resinous mixture into the reinforcing fibrous sheets through the separation sheets, and (d) (d-1) the step of heating the laminate under pressure or under no pressure to cure the resin to form the composite molded article, or (d-2) the step of heating the laminate under pressure or under no pressure to partially cure the resin to form a partially cured composite material having shape retainability, and then completing the curing of the partially cured composite material in a mold to form the composite molded article.

2. A process for the production of a composite molded article in which a core portion of a porous resin layer is present between surface portions of a fiber-reinforced resin and the whole of the composite molded article is integrated, the process comprising the following steps,
   (a) the mixture preparation step of preparing a particles-containing resinous mixture of a curable liquid molding resin with light-weight filler particles having an average particle size of 0.01 to 2 mm, the light-weight filler particles being a mixture of rigid particles and compressible particles,
   (b) the laminate preparation step of preparing a laminate of a reinforcing fibrous sheet/separation sheet/layer of the resinous mixture in the above step (a)/separation sheet/reinforcing fibrous sheet,
   (c) the impregnation step of centripetally pressing and centrifugally relaxing the laminate at least once each, thereby removing gas bubbles other than gas bubbles contained in the particles with infiltrating the liquid molding resin contained in the layer of the resinous mixture into the reinforcing fibrous sheets through the separation sheets,
   (d) the curing step of curing the liquid molding resin and molding the laminate by heating the laminate in a mold heated at a predetermined temperature to form the cured composite molded article, and
   (e) the step of opening the mold and taking out the obtained composite molded article.

3. The process of claim 2, wherein the light-weight filler particles substantially do not expand under curing conditions.

4. The process of claim 2, wherein the light-weight filler particles have an average particle size of 0.08 to 1 mm.

5. The process of claim 2, wherein the light-weight filler particles have a specific gravity of 0.02 to 0.8.

6. The process of claim 2, wherein the light-weight filler particles are a mixture comprising rigid particles and compressible particles in a rigid particles/compressible particles volume ratio of 95/5 to 5/95.

7. The process of claim 2, wherein the separation sheet is a fibrous sheet or a porous film having an opening through which the liquid molding resin passes but the light-weight filler particles are prevented from passing.

8. The process of claim 2, wherein marginal portions of the opposing two separation sheets are bonded to each other in the form of a bag or an envelope and the mixture of the curable liquid molding resin and the light-weight filler particles is sealed therein.

9. The process of claim 2, wherein a flexible film is placed on a lower surface or each surface of the laminate of reinforcing fibrous sheet/separation sheet/layer of the resinous mixture prepared in the step (a)/separation sheet/reinforcing fibrous sheet, and then the laminate is pressed and relaxed for curing.

10. The process of claim 2, wherein a reinforcement material is placed in the layer of the resinous mixture prepared in the step (a).

11. The process of claim 2, wherein the resinous mixture preparation step (a) and the laminate preparation step (b) are performed outside a mold and the impregnation step (c) and the curing step (d) are performed in a mold.

12. The process of claim 2, wherein the resinous mixture preparation step (a), the laminate preparation step (b) and the impregnation step (c) are performed outside a mold and the curing step (d) is performed in a mold.

13. A process for the production of a composite molded article in which a core portion of a porous resin layer is present between two surface portions of a fiber-reinforced resin and the whole of the composite molded article is integrated, the process including the following steps,
   (a) the mixture preparation step of preparing a particles-containing resinous mixture of a curable liquid molding resin with light-weight filler particles having an average particle size of 0.01 to 2 mm, the light-weight filler particles being a mixture of rigid particles and compressible particles,
   (b) the laminate preparation step of continuously feeding two separation sheets and two reinforcing fibrous sheets such that the two separation sheet are positioned between the two reinforcing fibrous sheets and continuously feeding the mixture prepared in the above step (a) into a portion between the two separation sheets, to continuously prepare a laminate of a reinforcing fibrous sheet/separation sheet/layer of the resinous mixture in the above step (a)/separation sheet/ reinforcing fibrous sheet,
   (c) the impregnation step of centripetally pressing and centrifugally relaxing the laminate at least once each, thereby removing gas bubbles other than gas bubbles contained in the particles with infiltrating the liquid molding resin contained in the layer of the resinous mixture into the reinforcing fibrous sheets through the separation sheets, and
   (d) the curing step of heating the laminate under pressure or under no pressure to cure the resin to form the composite molded article.

14. A process for the production of a partially cured composite material in which a core portion of a porous resin layer is present between surface portions of a fiber-reinforced resin and the whole of the composite molded article is integrated, the process including the following steps,
   (a) the mixture preparation step of preparing a particles-containing mixture of a curable liquid molding resin with light-weight filler particles having an average particle size of 0.01 to 2 mm, the light-weight filler particles being a mixture of rigid particles and compressible particles,
   (b) the laminate preparation step of continuously feeding two separation sheets and two reinforcing fibrous sheets such that the two separation sheet are positioned between the two reinforcing fibrous sheets and continuously feeding the mixture prepared in the above step (a) into a portion between the two separation sheets, to continuously prepare a laminate of a reinforcing fibrous sheet/separation sheet/layer of the mixture in the above step (a)/separation sheet/reinforcing fibrous sheet,
   (c) the impregnation step of centripetally pressing and centrifugally relaxing the laminate at least once each, thereby removing gas bubbles other than gas bubbles contained in the particles with infiltrating the liquid molding resin contained in the layer of the mixture into the reinforcing fibrous sheets through the separation sheets, and
   (d) the partially curing step of heating the laminate under pressure or under no pressure to partially cure the resin to form the partially cured composite material having form retainability.

15. The process of claim 13, wherein the light-weight filler particles substantially do not expand under curing conditions.

16. The process of claim 13, wherein the light-weight filler particles have an average particle diameter of 0.08 to 1 mm.

17. The process of claim 13, wherein the light-weight filler particles have a specific gravity of 0.02 to 0.8.

18. The process of claim 13, wherein the light-weight filler particles are a mixture comprising rigid particles and compressible particles in a rigid particles/compressible particles volume ratio of 95/5 to 5/95.

19. The process of claim 13, wherein the separation sheet is a fibrous sheet or a porous film having a mesh through which the liquid molding resin passes but the light-weight filler particles are prevented from passing.

20. The process of claim 13, wherein marginal portions of the opposing two separation sheets are bonded to each other in the form of a bag or an envelope and the mixture of the curable liquid molding resin and the light-weight filler particles is sealed therein.

21. The process of claim 13, wherein a flexible film is placed on a lower surface or each surface of the laminate of reinforcing fibrous sheet/separation sheet/layer of the mixture prepared in the step (a) separation sheet/reinforcing fibrous sheet, and then the laminate is pressed and relaxed for curing.

22. The process of claim 13, wherein the laminate preparation step (b), the impregnation step (c) and the curing step (d) are carried out in a continuous process.

23. The process of claim 13, wherein the curing step (d) is continuously carried out in an apparatus capable of maintaining a flat plane under plane pressure while the laminate is under a certain pressure.

24. The process of claim 13, wherein in the impregnation step (c) the laminate is pressed and relaxed by passing the laminate through a nip of at least one pair of upper and lower rollers while carrying the laminate with keeping a flat plane.

25. The process of claim 13, wherein the process is carried out by conveying a three layered sheet of separation sheet/ reinforcing fibrous sheet/flexible film, continuously forming a layer of the resinous mixture on the separation sheet surface, laminating a separation sheet, a reinforcing fibrous sheet and an optional flexible film on the surface of the mixture layer in the order of the separation sheet, the reinforcing fibrous sheet and the optional flexible film, to form a laminate of flexible film/reinforcing fibrous sheet/ separation sheet/layer of the resinous mixture/separation sheet/reinforcing fibrous sheet/optional flexible film, carrying out the impregnation step of passing the laminate through the nip of at least one pair of rollers to centripetally press and centrifugally relax the laminate, while carrying the laminate with maintaining flat surfaces of the laminate, and then carrying out the curing step.

26. The process of claim 25, wherein the impregnation step is carried out while the laminate is passed through a nip of at least one pair of upper and lower rollers which are arranged such that the central line of the laminate moves up and down along zig-zag path.

27. The process of claim 13, wherein a reinforcement material is placed in the layer of the resinous mixture prepared in the step (a).

28. The process of claim 14, wherein the light-weight filler particles substantially do not expand under curing conditions.

29. The process of claim 14, wherein the light-weight filler particles have an average particle diameter of 0.03 to 1 mm.

30. The process of claim 14, wherein the light-weight filler particles have a specific gravity of 0.02 to 0.8.

31. The process of claim 14, wherein the light-weight filler particles are a mixture comprising rigid particles and compressible particles in a rigid particles/compressible particles volume ratio of 95/5 to 5/95.

32. The process of claim 14, wherein the separation sheet is a fibrous sheet or a porous film having a mesh through which the liquid molding resin passes but the light-weight filler particles are prevented from passing.

33. The process of claim 14, wherein marginal portions of the opposing two separation sheets are bonded to each other in the form of a bag or an envelope and the mixture of the curable liquid molding resin and the light-weight filler particles is sealed therein.

34. The process of claim 14, wherein a flexible film is placed on a lower surface or each surface of the laminate of reinforcing fibrous sheet/separation sheet/layer of the mixture prepared in the step (a)/separation sheet/reinforcing fibrous sheet, and then the laminate is pressed and relaxed for curing.

35. The process of claim 14, wherein the laminate preparation step (b), the impregnation step (c) and the curing step (d) are carried out in a continuous process.

36. The process of claim 14, wherein the curing step (d) is continuously carried out in an apparatus capable of maintaining a flat plane under plane pressure while the laminate is under a certain pressure.

37. The process of claim 14, wherein in the impregnation step (c) the laminate is pressed and relaxed by passing the laminate through a nip of at least one pair of upper and lower rollers while carrying the laminate with keeping a flat plane.

38. The process of claim 14, wherein the process is carried out by conveying a three layered sheet of separation sheet/ reinforcing fibrous sheet/flexible film, continuously forming a layer of the resinous mixture on the separation sheet surface, laminating a separation sheet, a reinforcing fibrous sheet and an optional flexible film on the surface of the mixture layer in the order of the separation sheet, the reinforcing fibrous sheet and the optional flexible film, to form a laminate of flexible film/reinforcing fibrous sheet/ separation sheet/layer of the resinous mixture/separation sheet/reinforcing fibrous sheet/optional flexible film, carrying out the impregnation step of passing the laminate through the nip of at least one pair of rollers to centripetally press and centrifugally relax the laminate, while carrying the laminate with maintaining flat surfaces of the laminate, and then carrying out the curing step.

39. The process of claim 38, wherein the impregnation step is carried out while the laminate is passed through a nip of at least one pair of upper and lower rollers which are arranged such that the central line of the laminate moves up and down along zig-zag path.

40. The process of claim 14, wherein a reinforcement material is placed in the layer of the resinous mixture prepared in the step (a).

41. A process for the production of a composite molded article in which a core portion of a porous resin layer is present between surface portions of a fiber-reinforced resin and the whole of the composite molded article is integrated, the process comprising the following steps, (a) the mixture preparation step of preparing a particles-containing resinous mixture of a curable liquid molding resin with light-weight rigid particles having an average particle size of 0.01 to 2 mm, (b) the laminate preparation step of continuously feeding two separation sheets and two reinforcing fibrous sheets such that the two separation sheet are positioned between the two reinforcing fibrous sheets and continuously feeding the resinous mixture prepared in the above step (a) into a portion between the two separation sheets, to continuously prepare a laminate of a reinforcing fibrous sheet/separation sheet/layer of the resinous mixture in the above step (a)/separation sheet/reinforcing fibrous sheet, (c) the impregnation step of centripetally pressing and centrifugally relaxing the laminate at least once each, thereby removing gas bubbles other than gas bubbles contained in the particles with infiltrating the liquid molding resin contained in the layer of the resinous mixture into the reinforcing fibrous sheets through the separation sheets, and (d) the curing step of heating the laminate under pressure or under no pressure to cure the resin to form the composite molded article.

42. A process for the production of a partially cured composite material in which a core portion of a porous resin layer is present between surface layers of a fiber-reinforced resin and the whole of the composite material is integrated, the process including the following steps, (a) the mixture preparation step of preparing a particles-containing resinous mixture of a curable liquid molding resin with light-weight rigid particles having an average particle size of 0.01 to 2 mm, (b) the laminate preparation step of continuously feeding two separation sheets and two reinforcing fibrous sheets such that the two separation sheet are positioned between the two reinforcing fibrous sheets and continuously feeding the resinous mixture prepared in the above step (a) into a portion between the two separation sheets, to continuously prepare a laminate of a reinforcing fibrous sheet/separation sheet/layer of the resinous mixture in the above step (a)/separation sheet/reinforcing fibrous sheet, (c) the impregnation step of centripetally pressing and centrifugally relaxing the laminate at least once each, thereby removing gas bubbles other than gas bubbles contained in the particles with infiltrating the liquid molding resin contained in the layer of the mixture into the reinforcing fibrous sheets through the separation sheets, and (d) the preliminary curing step of heating the laminate under pressure or under no pressure to partially cure the resin to form the partially cured composite material having shape retainability.

43. The process of claim 41, wherein the light-weight filler particles are inorganic particles which substantially do not expand under curing conditions.

44. The process of claim 41, wherein the light-weight filler particles have an average particle diameter of 0.03 to 1 mm.

45. The process of claim 41, wherein the light-weight filler particles have a specific gravity of 0.02 to 0.8.

46. The process of claim 41, wherein the separation sheet is a fibrous sheet or a porous film having a mesh through which the curable liquid molding resin passes but the light-weight filler particles are prevented from passing.

47. The process of claim 41, wherein marginal portions of the opposing two separation sheets are bonded to each other in the form of a bag or an envelope and the mixture of the curable liquid molding resin and the light-weight filler particles is sealed therein.

48. The process of claim 41, wherein a flexible film is placed on a lower surface or each surface of the laminate of reinforcing fibrous sheet/separation sheet/layer of the mixture prepared in the step (a)/separation sheet/reinforcing fibrous sheet, and then the laminate is pressed and relaxed for curing.

49. The process of claim 41, wherein the laminate preparation step (b), the impregnation step (c) and the curing step (d) are carried out in a continuous process.

50. The process of claim 41, wherein the curing step (d) is continuously carried out in an apparatus capable of maintaining a flat plane under plane pressure while the laminate is under a certain pressure.

51. The process of claim 41, wherein in the impregnation step (c) the laminate is pressed and relaxed by passing the laminate through a nip of at least one pair of upper and lower rollers while carrying the laminate with keeping a flat plane.

52. The process of claim 41, wherein the process is carried out by conveying a three layered sheet of separation sheet/reinforcing fibrous sheet/flexible film, continuously forming a layer of the resinous mixture on the separation sheet surface, laminating a separation sheet, a reinforcing fibrous sheet and an optional flexible film on the surface of the mixture layer in the order of the separation sheet, the reinforcing fibrous sheet and the optional flexible sheet, to form a laminate of flexible film/reinforcing fibrous sheet/separation sheet/layer of the mixture/separation sheet/reinforcing fibrous sheet/optional flexible film, carrying out the impregnation step of passing the laminate through the nip of at least one pair of rollers to centripetally press and centrifugally relax the laminate, while carrying the laminate with maintaining flat surfaces of the laminate, and then carrying out the curing step.

53. The process of claim 52, wherein the impregnation step is carried out while the laminate is passed through a nip formed by at least one pair of upper and lower rollers which is arranged such that the central line of the laminate moves up and down along a zig-zag path.

54. The process of claim 41, wherein a reinforcement material is placed in the layer of the mixture prepared in the step (a).

55. The process of claim 42, wherein the light-weight filler particles are inorganic particles which substantially do not expand under curing conditions.

56. The process of claim 42, wherein the light-weight filler particles have an average particle diameter of 0.03 to 1 mm.

57. The process of claim 42, wherein the light-weight filler particles have a specific gravity of 0.02 to 0.8.

58. The process of claim 42, wherein the separation sheet is a fibrous sheet or a porous film having a mesh through which the curable liquid molding resin passes but the light-weight filler particles are prevented from passing.

59. The process of claim 42, wherein marginal portions of the opposing two separation sheets are bonded to each other in the form of a bag or an envelope and the mixture of the curable liquid molding resin and the light-weight filler particles is sealed therein.

60. The process of claim 42, wherein a flexible film is placed on a lower surface or each surface of the laminate of reinforcing fibrous sheet/separation sheet/layer of the mixture prepared in the step (a)/separation sheet/reinforcing fibrous sheet, and then the laminate is pressed and relaxed for curing.

61. The process of claim 42, wherein the laminate preparation step (b), the impregnation step (c) and the curing step (d) are carried out in a continuous process.

62. The process of claim 42, wherein the curing step (d) is continuously carried out in an apparatus capable of maintaining a flat plane under plane pressure while the laminate is under a certain pressure.

63. The process of claim 42, wherein in the impregnation step (c) the laminate is pressed and relaxed by passing the laminate through a nip of at least one pair of upper and lower rollers while carrying the laminate with keeping a flat plane.

64. The process of claim 42, wherein the process is carried out by conveying a three layered sheet of separation sheet/ reinforcing fibrous sheet/flexible film, continuously forming a layer of the resinous mixture on the separation sheet surface, laminating a separation sheet, a reinforcing fibrous sheet and an optional flexible film on the surface of the mixture layer in the order of the separation sheet, the reinforcing fibrous sheet and the optional flexible sheet, to form a laminate of flexible film/reinforcing fibrous sheet/ separation sheet/layer of the mixture/separation sheet/ reinforcing fibrous sheet/optional flexible film, carrying out the impregnation step of passing the laminate through the nip of at least one pair of rollers to centripetally press and centrifugally relax the laminate, while carrying the laminate with maintaining flat surfaces of the laminate, and then carrying out the curing step.

65. The process of claim 64, wherein the impregnation step is carried out while the laminate is passed through a nip formed by at least one pair of upper and lower rollers which is arranged such that the central line of the laminate moves up and down along a zig-zag path.

66. The process of claim 42, wherein a reinforcement material is placed in the layer of the mixture prepared in the step (a).

* * * * *